(12) United States Patent
Komodakis et al.

(10) Patent No.: US 8,131,069 B2
(45) Date of Patent: Mar. 6, 2012

(54) SYSTEM AND METHOD FOR OPTIMIZING SINGLE AND DYNAMIC MARKOV RANDOM FIELDS WITH PRIMAL DUAL STRATEGIES

(75) Inventors: Nikos Komodakis, Heraklion (GR); Nikos Paragios, Vincennes (FR); Georgios Tziritas, Heraklion (GR)

(73) Assignee: Ecole Centrale de Paris, Grande Voies des Vignes, Chateney-Malabry, Cedex (FR)

( * ) Notice: Subject to any disclaimer, the term of this patent is extended or adjusted under 35 U.S.C. 154(b) by 935 days.

(21) Appl. No.: 12/138,142

(22) Filed: Jun. 12, 2008

(65) Prior Publication Data

US 2009/0252416 A1    Oct. 8, 2009

Related U.S. Application Data

(60) Provisional application No. 60/959,393, filed on Jul. 16, 2007.

(51) Int. Cl.
*G06K 9/00* (2006.01)
*G06K 9/62* (2006.01)

(52) U.S. Cl. ...................................... 382/165; 382/224

(58) Field of Classification Search .................. 382/162, 382/165, 173, 181, 199, 224, 254, 269, 274, 382/276
See application file for complete search history.

(56) References Cited

U.S. PATENT DOCUMENTS

| | | | |
|---|---|---|---|
| 7,187,810 B2 * | 3/2007 | Clune et al. | 382/294 |
| 7,506,167 B2 * | 3/2009 | Venkatesan et al. | 713/176 |
| 7,822,291 B2 * | 10/2010 | Guetter et al. | 382/294 |
| 2004/0255132 A1 * | 12/2004 | Venkatesan et al. | 713/190 |
| 2007/0297696 A1 * | 12/2007 | Hamza et al. | 382/294 |
| 2009/0080865 A1 * | 3/2009 | Jang et al. | 386/124 |

* cited by examiner

*Primary Examiner* — Brian Le

(57) ABSTRACT

A method for determining an optimal labeling of pixels in computer vision includes modeling an image by a graph having interior nodes and edges where each image point p is associated with a graph node, each pair of nearest neighbor points p, q is connected by a graph edge, each graph node p is associated with a singleton potential c(p), and each graph edge is associated with a pairwise potential function d(p,q). A label is randomly assigned to each point to initialize unary variables including an indicator function that indicates which label is assigned to which point and dual variables including height variables associated with each node p and label a, and balance variables associated with each edge (p,q) and label a. For each label, a new label c is selected, a capacitated graph is constructed and solved. The label selection divides the image into disjoint regions.

22 Claims, 34 Drawing Sheets

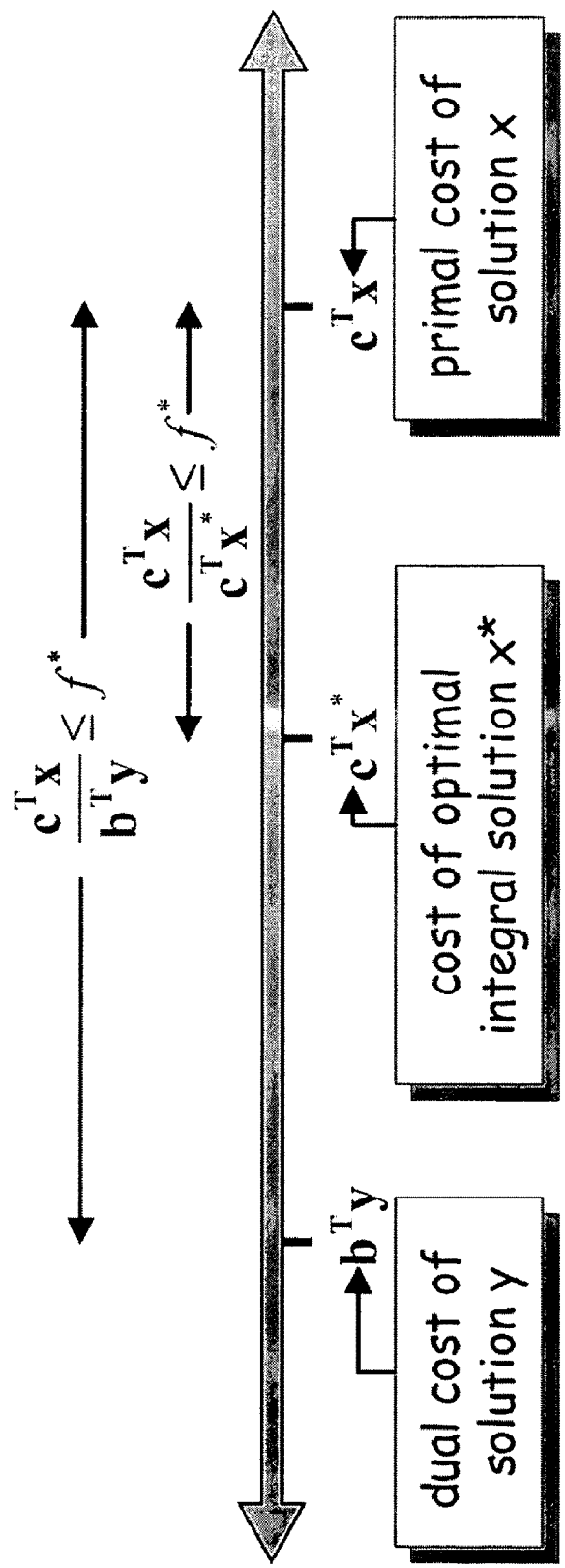
Fig. 2(a) The primal-dual principle

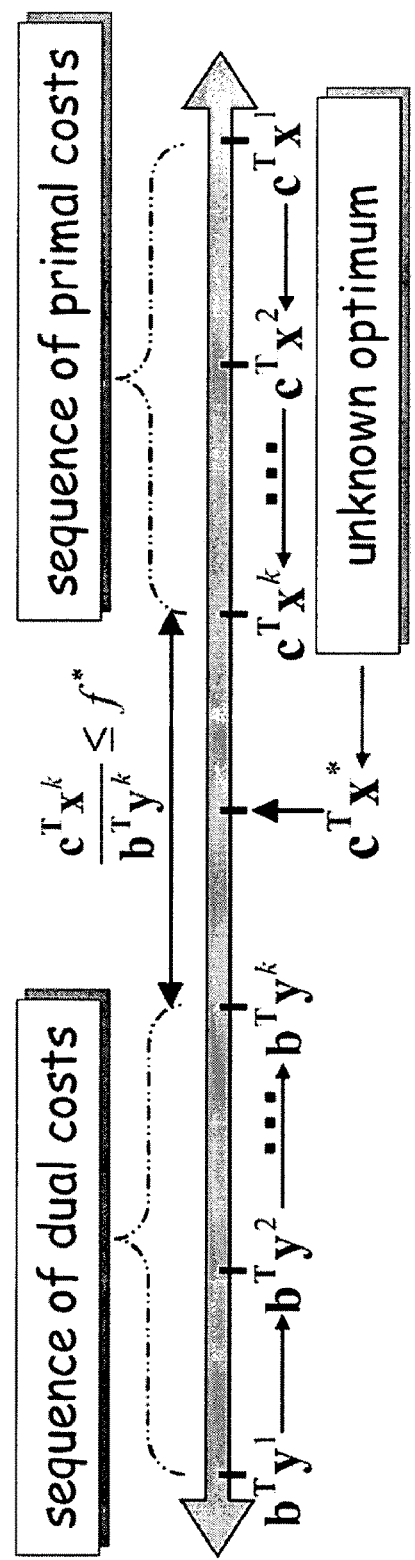
Fig. 2(b) The primal-dual schema

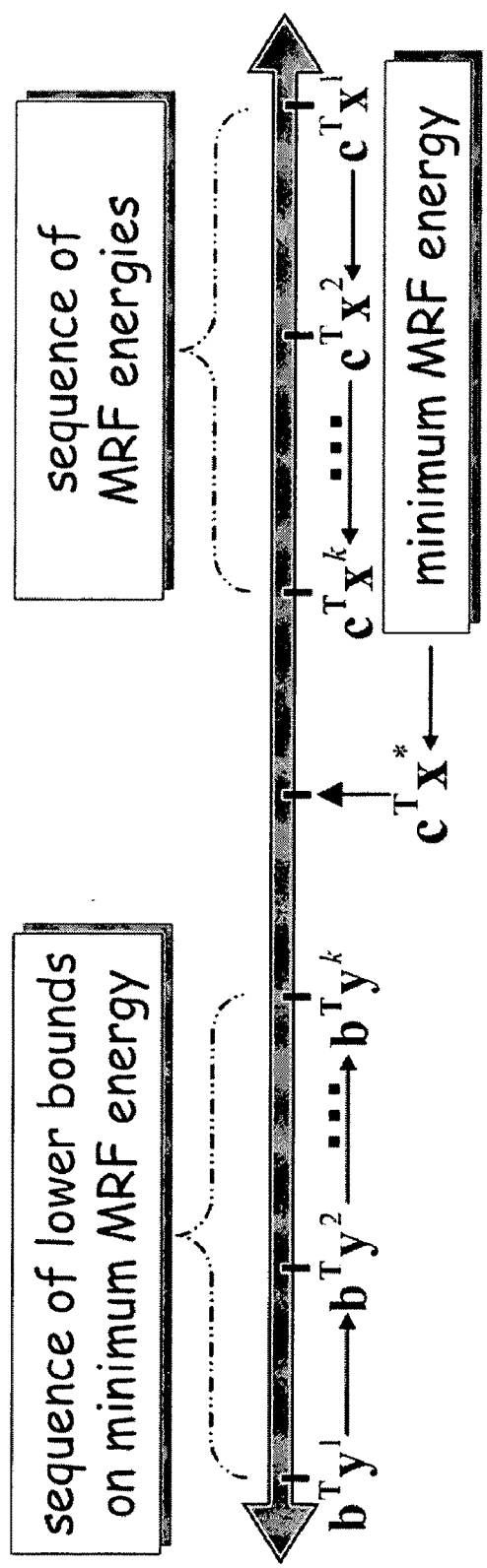
Fig. 2(c) The primal-dual schema for MRFs

1: $[x, y] \leftarrow$ INIT_DUALS_PRIMALS( ); $x_{old} \leftarrow x$
2: for each label $c$ in $\mathcal{L}$ do
3:    $y \leftarrow$ PREEDIT_DUALS$(c, x, y)$;
4:    $[x', y'] \leftarrow$ UPDATE_DUALS_PRIMALS$(c, x, y)$;
5:    $y' \leftarrow$ POSTEDIT_DUALS$(c, x', y')$;
6:    $x \leftarrow x'$; $y \leftarrow y'$;
7: end for
8: if $x \neq x_{old}$ then
9:    $x_{old} \leftarrow x$; goto 2;
10: end if

Fig. 4

[x,y]←INIT_DUALS_PRIMALS(): x←random labels; y←0;
$\forall pq$, adjust $y_{pq}(x_p)$ or $y_{qp}(x_q)$ so that $load_{pq}(x_p, x_q) = w_{pq}d(x_p, x_q)$ y←PREEDIT_DUALS(c,x,y):
$\forall pq$, if $load_{pq}(c, x_q) > w_{pq}d(c, x_q)$ or $load_{pq}(x_p, c) > w_{pq}d(x_p, c)$
adjust $y_{pq}(c)$ so that $load_{pq}(c, x_q) = w_{pq}d(c, x_q)$

[x',y']←UPDATE_DUALS_PRIMALS(c,x,y): x'←x; y'←y;
Construct $\mathcal{G}^c$ and apply max-flow to compute all flows $f_{sp}/f_{pt}$, $f_{pq}$
$\forall pq$, $y'_{pq}(c) \leftarrow y_{pq}(c) + f_{pq} - f_{qp}$
$\forall p$, if an unsaturated path from $s$ to $p$ exists, then $x'_p \leftarrow c$ y'←POSTEDIT_DUALS(c,x',y'): {We denote $load'_{pq}(\cdot,\cdot) = y'_{pq}(\cdot) + y'_{qp}(\cdot)$}
$\forall pq$, if $load'_{pq}(x'_p, x'_q) > w_{pq}d(x'_p, x'_q)$ {This implies $x'_p = c$ or $x'_q = c$}
adjust $y'_{pq}(c)$ so that $load'_{pq}(x'_p, x'_q) = w_{pq}d(x'_p, x'_q)$

Fig. 8

| exterior capacities | interior capacities | |
|---|---|---|
| $cap_{sp} = [h_p(x_p) - h_p(c)]^+$ $cap_{pt} = [h_p(c) - h_p(x_p)]^+$ | $cap_{pq} = [w_{pq} d(c, x_q) - load_{pq}(c, x_q)]^+$ $cap_{qp} = [w_{pq} d(x_p, c) - load_{pq}(x_p, c)]^+$ | $cap_{pq} = 0$ $cap_{qp} = 0$ |
| | $x_p \neq c \wedge x_q \neq c$ | $x_p = c \vee x_q = c$ |

Fig. 9

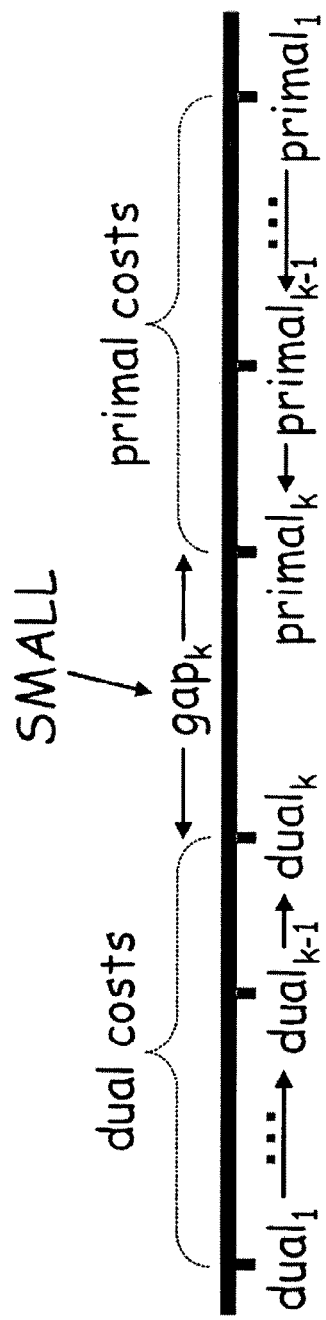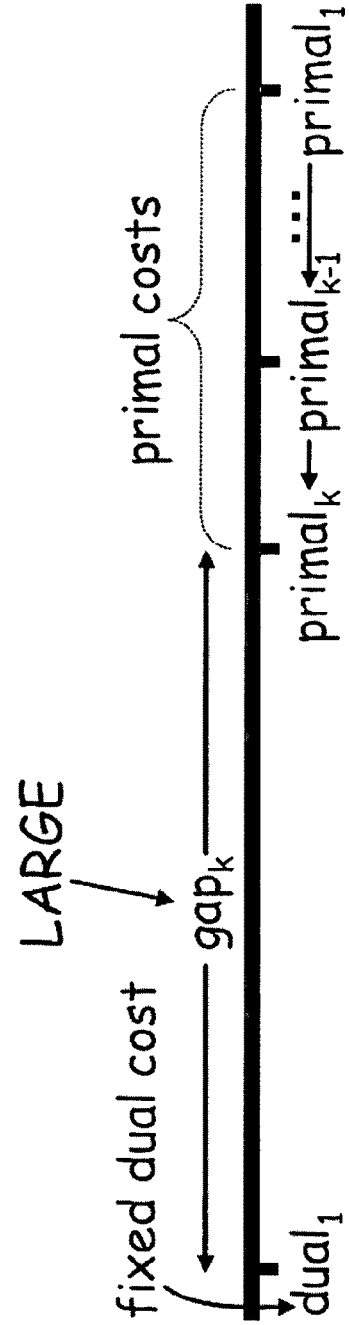
Fig. 11(a)
Fig. 11(b)

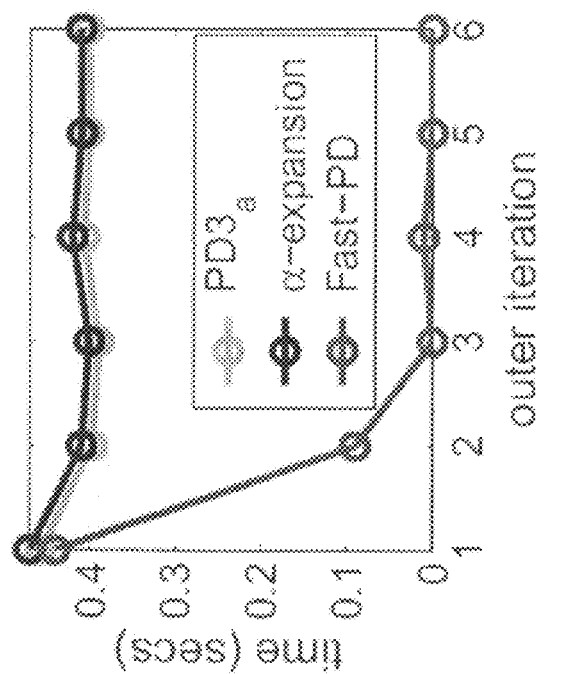

[x, y] ← INIT_DUALS_PRIMALS(x̄, ȳ):
  x ← x̄; y ← ȳ;
  ∀p,q, y_{pq}(x_p) += w_{pq}d(x_p, x_q) − w̄_{pq}d̄(x_p, x_q);
  ∀p, h_p(·) += c_p(·) ← −c̄_p(·);

Fig. 20

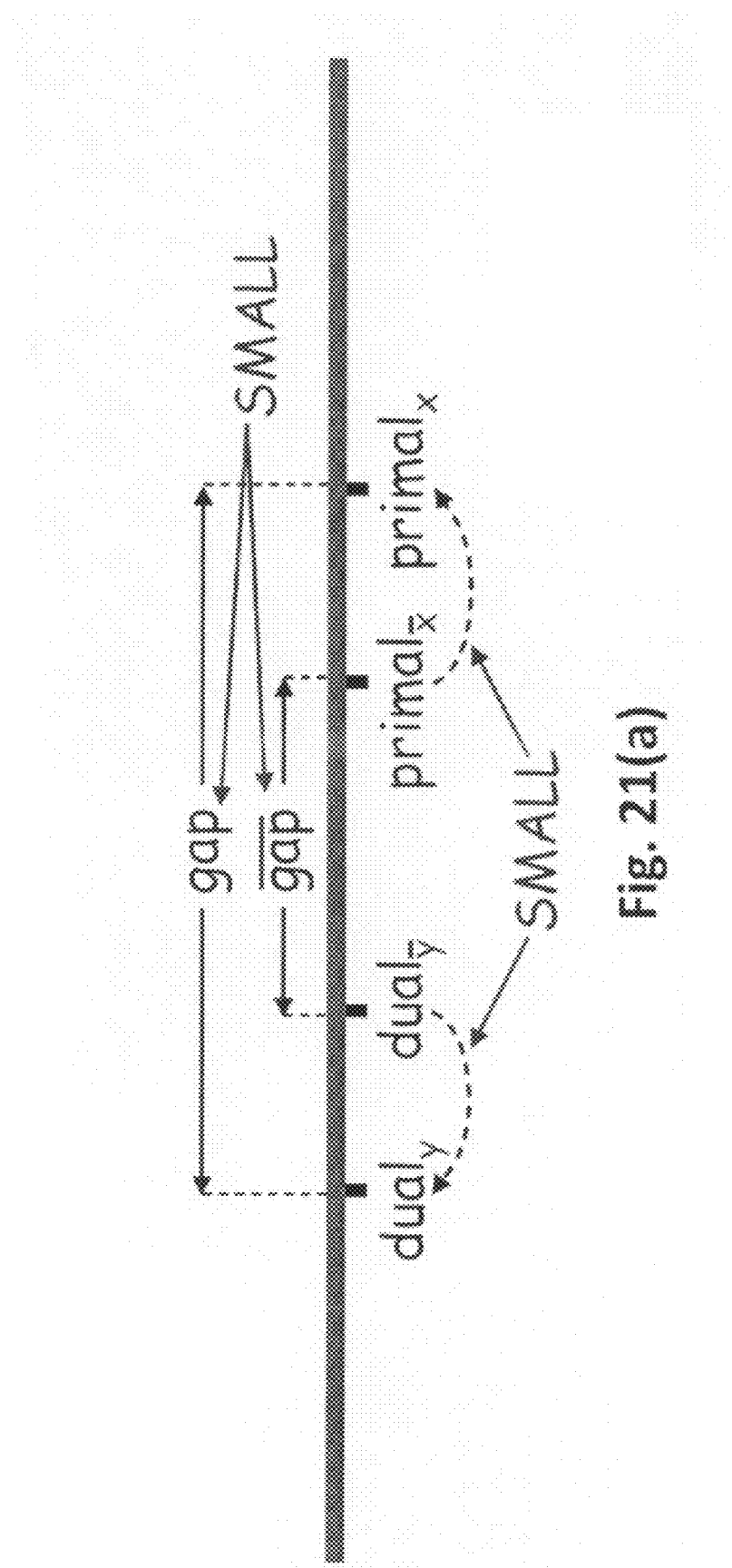

SYSTEM AND METHOD FOR OPTIMIZING SINGLE AND DYNAMIC MARKOV RANDOM FIELDS WITH PRIMAL DUAL STRATEGIES

CROSS REFERENCE TO RELATED UNITED STATES APPLICATIONS

This application claims priority from "Fast approximately optimal solutions for single and dynamic MRFs", U.S. Provisional Application No. 60/959,393 of Komodakis, et al., filed Jul. 16, 2007, the contents of which are herein incorporated by reference in their entirety.

TECHNICAL FIELD

This disclosure is directed to the application of Markov Random Fields (MRFs) to medical imaging and computer vision, including image segmentation, 3D reconstruction, texture synthesis, image completion, image denoising, object recognition, and visual correspondence.

DISCUSSION OF THE RELATED ART

A wide variety of tasks in computer vision and pattern recognition can be formulated as discrete labeling programs. Furthermore, many of these programs can be very elegantly expressed in the language of discrete Markov Random Fields (MRFs) and it is for this reason that MRF optimization is considered to be a useful task, which has attracted much research in computer vision in recent years.

In very simple terms, the question of MRF optimization can be stated as follows. One is given a discrete set of objects V, all of which are vertices in a graph G. The edges of this graph (denoted by E) encode the objects' relationships. One is also given as input a discrete set of labels L. One must then assign one label from L to each object in V. However, each time a label is assigned, say, $x_p$ to an object p, one is forced to pay a price according to a singleton potential function $c_p(x_p)$, while each time a pair of labels, say, $x_p$ and $x_q$, is assigned to two interrelated objects p and q (i.e, two objects that are connected to each other by an edge in the graph G), one is also forced to pay another price, which is now determined by a pairwise potential function $d(x_p, x_q)$ (both the singleton and pairwise potential functions are situation specific and are thus assumed to be provided as input). For simplicity sake, it will be assumed herein below that all edges of the MRF share a common pairwise potential function $d(,)$, but note that everything mentioned herein also applies to the general case where there exists a unique pairwise potential function $d_{pq}(,)$ for each edge pq.

The goal is then to choose a labeling which pays the smallest total price. In other words, based on what is mentioned above, one wants to choose a labeling that minimizes the sum of all the MRF potentials, or equivalently the MRF energy. This amounts to optimizing the following expression:

$$\arg\min_{\{x_p\}} \sum_{p \in V} c_p(x_p) + \sum_{(p,q) \in E} w_{pq} d(x_p, x_q). \quad (1)$$

Note that, in the above formula, there is also included a weight $w_{pq}$ per edge, which can be used for scaling (either up or down) the pairwise potential function associated with that edge.

Despite this simple formulation, MRFs have great descriptive power and offer an extremely flexible framework capable of modeling a wide range of systems. For this reason, they have been popular in computer vision, including image segmentation, 3D reconstruction, texture synthesis, image completion, image denoising, object recognition, visual correspondence, just to mention a few of the applications of discrete MRFs in computer vision. However, it should be noted that they have been used successfully in other disciplines as well, including medical imaging, computer graphics, machine learning and artificial intelligence, digital communications, error-correcting coding theory, and statistical physics.

Hence, given the popularity of MRFs, it becomes apparent that MRF optimization is a task of importance with applications in many areas. Yet, this task is non-trivial since almost all interesting MRFs exhibit a non-convex energy function (with many local minima), which is NP-hard to optimize. This has motivated much research about MRF optimization in recent years and, as a result, many algorithms have been proposed on this topic. Algorithms such as ICM (Iterated Conditional Modes), HCF (Highest Confidence First), relaxation labeling or simulated annealing were among the first ones to be used in this regard. These early algorithms, however, have proven not to be particularly effective in handling MRF optimization tasks such as those encountered in the areas mentioned above. Progress in MRF optimization has been achieved over the last years, primarily due to the introduction of two classes of methods, those based on graph-cuts, which includes methods such as the $\alpha$-expansion or the $\alpha\beta$-swap, and those based on belief propagation, which includes methods such as loopy Belief Propagation and Tree Reweighted message-passing.

Returning now to the issue of MRF optimization, it should be noted that, of course, not all MRFs encountered in practice are equally challenging to optimize. Referring to FIG. 1, the complexity of optimizing an MRF (vertical axis) depends on the type of the its pairwise potential function (horizontal axis). FIG. 1 shows how this complexity varies for a few typical pairwise potential functions. The complexity of any given MRF optimization depends not so much on the form of its singleton potential functions (which can be arbitrary), but mostly on the form of its pairwise potential functions. For example, if each pairwise potential function is submodular (which can be roughly considered as a discrete counterpart of convexity), the MRF can be optimized in polynomial time, i.e the exact global optimum can be computed. If, on the other hand, each pairwise potential is assumed to be simply a metric distance function, then the resulting MRF optimization proves to be NP-hard. Nevertheless, not everything is lost in this case, since there still exist efficient algorithms for obtaining an approximately optimal solution, which is the best one can hope to achieve given the NP-complexity of the optimization. However, if absolutely no assumptions are imposed on the structure of the pairwise potential functions, then no approximation guarantees can be provided at all and only a local minimum can be returned as a result.

Ideally, one would like an MRF optimization algorithm that is able to handle NP-hard MRFs whose pairwise potential function is as general as possible (this means going as far as possible towards the right direction in the horizontal axis in FIG. 1), but which is also capable of providing solutions that are approximately optimal as well (this means keeping the height as low as possible in the vertical axis, i.e, below the blue dashed line). Referring again to FIG. 1, this statement could be interpreted as follows: one would like the projection of an algorithm on the horizontal axis to be as large as possible, corresponding to being able to handle MRFs with more general pairwise potentials, but at the same time one would like the vertical projection of an algorithm to be as small as possible, e.g., below the dashed horizontal line 11 in FIG. 1, corresponding to being able to generate a solution that, although possibly not optimal due to the NP-complexity, provides a good approximate to the optimal solution.

However, besides the above mentioned issue of the quality of the MRF solutions, another important issue is that of computational efficiency. This means that, ideally, besides being able to compute a solution which is as accurate as possible, an algorithm should also be able to do that as fast as possible, i.e at a low computational cost. However, these two goals (i.e accuracy and speed) contradict each other and so, typically, one has to make a trade-off between them. In fact, this issue of computational efficiency has been recently looked at for the case of dynamic MRFs, which are MRFs whose potential functions are assumed to vary over time and which has been recently introduced into computer vision.

SUMMARY OF THE INVENTION

Exemplary embodiments of the invention as described herein generally include new graph-cut based methods and systems for MRF optimization for handling a wide class of MRFs encountered in image processing. An algorithm according to an embodiment of the invention builds on a primal-dual framework for MRF optimization to generate solutions that are approximately optimal by recovering pairs of solutions for a primal and a dual such that the gap between them is minimized. An algorithm according to an embodiment of the invention can provide both theoretical (i.e., worst-case) guarantees, and per-instance guarantees, with the latter being, in practice, much tighter than the former. Furthermore, it does not compromise efficiency. It thus can be used for boosting the optimization performance of static MRFs and of dynamic MRFs as well. In both cases, efficiency results from exploiting information related not only to a "primal" MRF optimization program, but also to an "LP-dual" program.

Graph-cut based optimization algorithms, such as the α-expansion method, try to optimize an MRF by solving a series of max-flow equations. Their efficiency is thus largely determined from the efficiency of these max-flow systems, which, in turn, depends on the number of augmenting paths per max-flow. An algorithm according to an embodiment of the invention uses a novel primal-dual MRF optimization method, referred to herein below as Fast-PD, that also solves max-flow equations for a series of graphs. The graphs constructed by a Fast-PD algorithm according to an embodiment of the invention can ensure that the number of augmentations per max-flow decreases over time, thus boosting the efficiency of MRF inference. To show this, a generalized relationship between the number of augmentations and a primal-dual gap associated with the original MRF program and its dual is proven.

Despite its efficiency, a method according to an embodiment of the invention does not compromise either the accuracy of the solutions it generates or the generality of the MRFs it can handle. So, for example, if the pairwise potentials $V_{pq}(,)$ are assumed to be metric functions, then it can be proven that Fast-PD is as powerful as the α-expansion, in the sense that it computes exactly the same solution, but faster. Moreover, it applies to a wider class of MRFs, in that it can even handle MRFs for which the pairwise potentials $V_{pq}(,)$ are non-metric functions. In fact, in all these cases, a method according to an embodiment of the invention can provide theoretical (i.e, worst-case) upper bounds about how far the energy of a generated solution can be from the unknown optimal MRF energy. But besides these theoretical upper bounds, a method according to an embodiment of the invention is also capable of providing per-instance upper bounds, i.e. bounds that are specific to each particular situation being tested. In practice, these bounds prove, of course, to be much tighter (i.e, much closer to 1) than the worst-case upper bounds and hence can be very useful for assessing how well the algorithm performed in each particular case.

Furthermore, besides being able to speed up the optimization of static MRFs, a method according to an embodiment of the invention can also be used for boosting the efficiency of dynamic MRFs. Fast-PD handles a wide class of dynamic MRFs, and achieves that by exploiting information coming from a program that is dual to the original MRF program.

Promising results in a number of applications, and theoretical, as well as numerical comparisons with the state of the art demonstrate the potential of a method according to an embodiment of the invention.

According to an aspect of the invention, there is provided a method for determining an optimal labeling of pixels in computer vision, the method including providing a digitized image comprising a plurality of intensities associated with an N-dimensional grid of points, modeling said image by a graph comprising a set of interior nodes N and a set of edges E wherein each image point p is associated with a graph node and each pair of nearest neighbor points p, q is connected by a graph edge, wherein each graph node p is associated with a singleton potential c(p), and each graph edge is associated with a pairwise potential function d(p, q), randomly assign a label from a set of labels L to each point p to initialize a set of unary variables x, said unary variables including an indicator function $x_p(\ )$ that indicate which label is assigned to which point p, and initialize a set of dual variables y to zero, wherein said dual variables include a height variable $h_p(a)$ associated with each node p and label a, and balance variables $y_{pq}(a)$, $y_{qp}(a)$ associated with each edge (p, q) and label a, wherein $$h_p(a) \equiv c_p(a) + \sum_{q:\, qp \in E} y_{pq}(a),$$

and for each label in L, selecting a new label c from said set L, constructing a capacitated graph G and solving a max-flow in said capacitated graph G to calculate an updated pair x', y', wherein said updated unary and dual variables satisfy the conditions $h_p(x_p)=\min_{a \in L} h_p(a)$, $\forall p \in V$, $y_{pq}(x_p)+y_{qp}(x_p)=w_{pq}d(x_p,x_q)$, $\forall pq \in E$, $y_{pq}(a)+y_{qp}(b) \leq 2w_{pq}d_{max}$, $\forall pq \in E$, $a \in L$, $b \in L$, wherein $w_{pq}$ is a weighting associated with each edge p,q, and wherein said label selection divides said image into disjoint regions.

According to a further aspect of the invention, solving said max-flow in said graph comprises providing a copy of all labels in l for each node p, wherein said height variables $h_p(a)$ specify a height of label a of node p relative to a reference plane, and updating balance variables of said c label to move said labels up or down until said conditions are satisfied, wherein a value of balance variable $y_{pq}(a)$ represents a partial raise of label a at p due to edge pq, while a total raise of a at p equals a sum of partial raises from all edges of G incident to p.

According to a further aspect of the invention, the method includes initializing said balance variables $y_{pq}(x_p)$, $y_{qp}(x_q)$ for all edges pq wherein $y_{pq}(x_p)+y_{qp}(x_q)=w_{pq}d(x_p, x_q)$.

According to a further aspect of the invention, the method includes, before selecting a new label c from said set L, for all edges pq, adjusting said balance variables $y_{pq}(c)$, $y_{qp}(c)$ for said label c if $y_{pq}(c)+y_{qp}(x_q)>w_{pq}d(c, x_q)$ or $y_{pq}(x_p)+y_{qp}(c)>w_{pq}d(x_p, c)$.

According to a further aspect of the invention, the method includes, after selecting a new label c from said set L, for all edges pq, if $y'_{pq}(x'_p)+y'_{qp}(x'_q)>w_{pq}d(x'_p, x'_q)$, adjusting said balance variables $y'_{pq}(x'_p)$, $y'_{qp}(x'_q)$ for said label $x'_p=c$ or $x'_q=c$ wherein $y'_{pq}(x'_p)+y'_{qp}(x'_q)=w_{pq}d(x'_p, x'_q)$.

According to a further aspect of the invention, constructing said capacitated graph G comprises adding an external source node s and an external sink node t to said graph, for all internal nodes, connecting a node p to sink node t through an external directed edge pt if $h_p(c) \geq h_p(x_p)$ and defining a capacity of said edge as $cap_{pt}=h_p(c)-h_p(x_p)$, or connecting a node p to source node s through an external directed edge ps if $h_p(c)<h_p(x_p)$ and defining a capacity of said edge as $cap_{sp}=h_p(x_p)-h_p(c)$, and for all internal edges pq connecting internal nodes p, q, defining a capacity $cap_{pq}=cap_{qp}=0$ if $x_p=c$ or $x_q=c$, or defining a capacity $cap_{pq}=\max[w_{pq}d(c, x_q)-load_{pq}(c, x_q), 0]$ and a capacity $cap_{qp}=\max[w_{pq}d(x_p, c)-load_{pq}(x_p, c), 0]$ if $x_p \neq c$ and $x_q \neq c$.

According to a further aspect of the invention, calculating an updated pair x', y' comprises calculating all flows $f_{sp}$, $f_{pt}$, for all external edges sp, pt, and flows $f_{pq}$, for all internal edges pq, calculating $y'_{pq}(c) \leftarrow y_{pq}(c)+f_{pq}-f_{qp}$ for all internal edges pq, and, for all internal nodes, setting $x'_p \leftarrow c$ if an unsaturated path from s to p exists.

According to a further aspect of the invention, the method includes initializing a source tree and a sink tree for finding new augmenting paths, adding new augmenting paths to the source tree during max-flow, and keeping track of all source-linked nodes wherein source-linked nodes need not be recomputed at each iteration of said max-flow.

According to a further aspect of the invention, the method includes incrementally setting capacities, wherein if during an interval from a previous to a current iteration, no change of label took place for p and q, then capacities of interior edges pq, qp and of exterior edges sp, pt, sq, qt are set equal to residual capacities of corresponding edges in a graph of the previous iteration.

According to a further aspect of the invention, the method includes updating said singleton potential function c(p) and said pairwise potential function d(p,q), reinitializing said unary variables x and dual variables y from said updated pair x', y', incrementing said balance variables $y_{pq}(x_p)$ for each edge (pq) by a difference $w_{pq}d(x_p, x_q)-\overline{w}_{pq}\overline{d}(x_p, x_q)$ wherein $\overline{w}_{pq}$ is an updated weight and $\overline{d}(x_p, x_q)$ is the updated pairwise potential function, and incrementing said height variables $h_p(x_p)$ for each node p by a difference $c_p(x_p)-\overline{c}_p(x_p)$, wherein $\overline{c}_p(x_p)$ is the updated singleton potential.

According to another aspect of the invention, there is provided a program storage device readable by a computer, tangibly embodying a program of instructions executable by the computer to perform the method steps for determining an optimal labeling of pixels in computer vision.

BRIEF DESCRIPTION OF THE DRAWINGS

FIGS. 2(a)-(c) illustrate respectively, the primal-dual principle, the primal-dual schema, and the primal-dual schema applied to MRFs, according to an embodiment of the invention.

FIG. 4 depicts pseudocode illustrating the basic structure of a primal-dual algorithm according to an embodiment of the invention.

FIG. 8 depicts pseudocode for a modified primal-dual algorithm according to an embodiment of the invention.

FIG. 9 is a table that summarizes how a Fast-PD according to an embodiment of the invention sets the capacities for all edges of $G^c$, according to an embodiment of the invention.

FIGS. 11(a)-(b) are high level illustrations comparing the use of primal-dual solutions by a Fast-PD algorithm to an α-expansion algorithm, according to an embodiment of the invention.

FIGS. 13(a)-(c) are graphs of the total time per outer iteration for the examples of FIGS. 10(a)-(f), and FIG. 13(d) compares the resulting total running times for the same examples, according to an embodiment of the invention.

FIG. 20 shows the pseudocode for the case of dynamic MRFs, according to an embodiment of the invention.

FIGS. 21(a)-(b) illustrates how a primal-dual algorithm reduces costs, as compared to a primal-only algorithm, according to an embodiment of the invention.

DETAILED DESCRIPTION OF EXEMPLARY EMBODIMENTS

Figure 1:
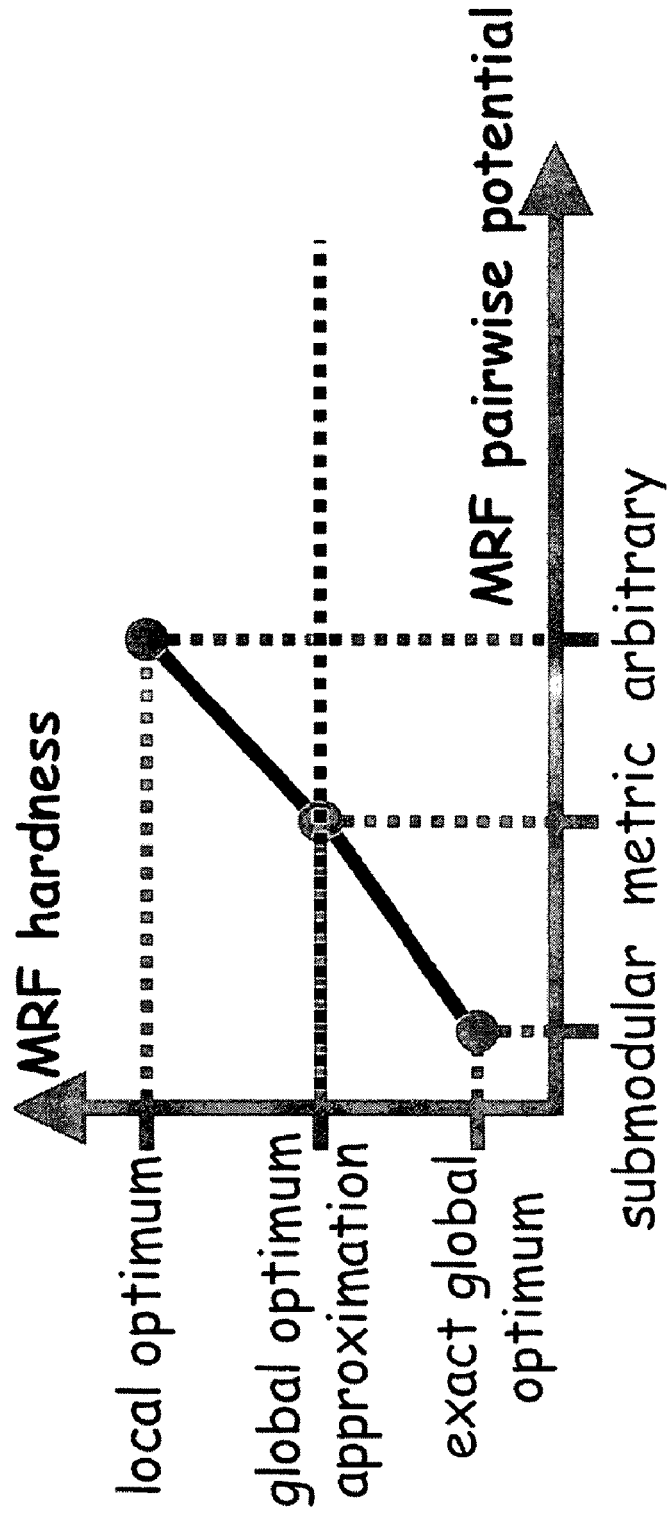
FIG. 1 illustrates how optimizing an MRF depends on the type of the its pairwise potential function, according to an embodiment of the invention.

Exemplary embodiments of the invention as described herein generally include systems and methods for minimizing static and dynamic MRFs by recovering pairs of solutions for a primal and a dual such that the gap between them is minimized. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Background on Graphs

In this section are reviewed some basic facts about graphs in the context of energy minimization methods in vision. A directed weighted (capacitated) graph $G=\{V, E\}$ includes a set of nodes V and a set of directed edges E that connect them. Usually the nodes correspond to pixels, voxels, or other features. A graph normally contains some additional special nodes that are called terminals. In the context of vision, terminals correspond to the set of labels that can be assigned to pixels. An exemplary situation is the case of graphs with two terminals. Then the terminals are usually called the source, s, and the sink, t. There is some variation in the structure of graphs used in other energy minimization methods in vision. However, most of them are based on regular 2D or 3D grid graphs. This is a simple consequence of the fact that normally graph nodes represent regular image pixels or voxels.

All edges in the graph are assigned some weight or cost. A cost of a directed edge (p, q) may differ from the cost of the reverse edge (q, p). Normally, there are two types of edges in the graph: n-links and t-links. N-links are internal edges that connect pairs of neighboring pixels or voxels. Thus, they represent a neighborhood system in the image. The cost of the n-links corresponds to a penalty for discontinuity between the pixels. These costs are usually derived from the pixel interaction term in the energy of EQ. (1). T-links connect pixels with terminals (labels). The cost of a t-link connecting a pixel and a terminal corresponds to a penalty for assigning the corresponding label to the pixel. This cost is normally derived from the singleton term in the energy of EQ. (1).

Min-Cut and Max-Flow Problems

An s/t cut C on a graph with two terminals is a partitioning of the nodes in the graph into two disjoint subsets S and T such that the source s is in S and the sink t is in T. For simplicity, s/t cuts are referred to herein below as just cuts. In combinatorial optimization the cost of a cut $C=\{S, T\}$ is defined as the sum of the costs of "boundary" edges (p, q) where $p \in S$ and $q \in T$. Note that cut cost is "directed" as it sums up weights of directed edges specifically from S to T. The minimum cut problem on a graph is to find a cut that has the minimum cost among all cuts.

A fundamental results in combinatorial optimization is that the minimum cut can be found by calculating a maximum flow from the source s to the sink t. Loosely speaking, maximum flow is the maximum "amount of water" that can be sent from the source to the sink by interpreting graph edges as directed "pipes" with capacities equal to edge weights. A maximum flow from s to t saturates a set of edges in the graph dividing the nodes into two disjoint parts $\{S, T\}$ corresponding to a minimum cut. Thus, min-cut and max-flow problems are equivalent. In fact, the maximum flow value is equal to the cost of the minimum cut.

An exemplary augmenting path based algorithm works by pushing flow along non-saturated paths from the source to the sink until the maximum flow in the graph G is reached. A typical augmenting path algorithm stores information about the distribution of the current s→t flow f among the edges of G using a residual graph $G_f$. The topology of $G_f$ is identical to G but capacity of an edge in $G_f$ reflects the residual capacity of the same edge in G given the amount of flow already in the edge. At the initialization there is no flow from the source to the sink (f=0) and edge capacities in the residual graph $G_0$ are equal to the original capacities in G. At each new iteration the algorithm finds the shortest s→t path along non-saturated edges of the residual graph. If a path is found then it is augmented by pushing the maximum possible flow df that saturates at least one of the edges in the path. The residual capacities of edges in the path are reduced by df while the residual capacities of the reverse edges are increased by df. Each augmentation increases the total flow from the source to the sink f=f+df. The maximum flow is reached when any s→t path crosses at least one saturated edge in the residual graph $G_f$.

Typically, a breadth-first search is used to find the shortest paths from s to t on the residual graph $G_f$. After all shortest paths of a fixed length k are saturated, the algorithm starts the breadth-first search for s→t paths of length k+1 from scratch. Note, however, that in the context of graphs in computer vision, building a breadth-first search tree typically involves scanning the majority of image pixels. This can be a very expensive operation if it has to be performed frequently.

The Primal-dual Schema

The primal-dual schema is a well known technique in combinatorial optimization. It started as a general technique for solving linear programming (LP) systems. As a result, it has been initially used for deriving exact polynomial-time algorithms to many systems in combinatorial optimization, including max-flow, matching, shortest path, minimum branching and minimum spanning tree. However, it was realized that it can be a useful tool for deriving approximation algorithms for linear integer programming as well. It has thus been used for providing good approximation algorithms to many NP-hard combinatorial systems such as those of set-cover, steiner-network, scheduling, steiner tree, feedback vertex set, etc. The basic idea behind using the technique is as follows.

Suppose one wants to solve the following linear integer program:

$$\min c^T x \text{ subject to } Ax=b, x \in N. \quad (2)$$

Because of the fact that constraints $x \in N$ require the components of the solution x to be natural numbers, the resulting optimization becomes NP-hard. This means that one can only hope for an approximate solution to that program. To achieve this goal, one relaxes the complicating integrality constraints $x \in N$ as follows:

$$\min c^T x, \text{ subject to } Ax=b, x \geq 0 \quad (3)$$

One thus obtains a linear program, which is, of course, much easier to solve. However, the reason for doing that is not to solve this LP, but to take its dual program, which forms, of course, another LP:

$$\max b^T y \text{ subject to } A^T y \leq c. \quad (4)$$

As a result of this process, there are now two programs: the original linear integer program (this will be referred to as the primal program), as well as a dual linear program. According to the primal-dual schema, one must then find a pair (x, y) of primal and dual solutions such that the corresponding primal-dual gap (i.e, the distance between the cost $c^T x$ of the primal solution and the cost $b^T y$ of the dual solution) is small enough. One way for measuring this is to require that the ratio between these two costs is smaller than, say, f*. If one manages to find such a primal-dual pair, then it is guaranteed that the estimated primal solution x is actually an f*-approximation to the unknown optimal solution of the original program, as stated in the following theorem.

THEOREM 1 (The primal-dual principle). If x and y are integral-primal and dual feasible solutions satisfying:

$$c^T x \leq f^* b^T y, \quad (5)$$

then x is an f*-approximation to the optimal integral solution x*, i.e., $$c^T x^* \leq c^T x \leq f^* c^T x^*.$$

The reason that this principle holds true is rather simple and is illustrated graphically in FIG. 2(a). By weak duality, the optimal cost $c^T x^*$ of the optimal integral solution will always lie between the dual cost $b^T y$ and primal cost $c^T x$ of any pair (x, y) of integral-primal and dual feasible solutions, i.e. it will hold $b^T y \leq c^T x^* \leq c^T x$. Therefore, if $b^T y$ and $c^T x$ are close enough (e.g. their ratio is f*), so are $c^T x^*$ and $c^T x$ (e.g. their ratio is ·f* as well), thus proving that x is an f*-approximation to x*. Therefore, if the ratio between the two costs $c^T x$ and $b^T y$ is smaller than f* then the same thing will necessarily apply to the ratio between the costs $c^T x$ and $c^T x^*$, which thus proves the above theorem.

Of course, one cannot expect to come up with such a good primal-dual pair (x, y) right from the beginning. So what typically happens is that the primal-dual algorithm proceeds iteratively, where each iteration consists of one update of both the primal and dual variables. FIG. 2(b) illustrates a primal-dual schema, according to which dual and integral-primal feasible solutions make local improvements to each other, thus generating sequences of primal and dual costs. Hence, given a current pair of solutions, say, $(x^k, y^k)$, one proceeds as follows: first, based on the current dual solution $y^k$, one tries to improve the primal solution, thus generating a new solution $x^{k+1}$, so that its cost $c^T x^{k+1}$ comes closer to the dual cost $b^T y^k$. Similarly, based on the new primal solution $x^{k+1}$, one tries to improve the dual solution, thus generating a new solution $y^{k+1}$, so that its cost $b^T y^{k+1}$ also comes closer to the primal cost $c^T x^{k+1}$. In this manner a new pair $(x^{k+1}, y^{k+1})$ is generated, which means that one iteration of the algorithm has just been completed. This is, of course, repeated (thus producing sequences of primal and dual costs) until the final costs $b^T y^t$, $c^T x^t$ are close enough (e.g., their ratio is f*), in which case one can apply the primal-dual principle (as in FIG. 2(a)) and thus conclude that $x^t$ is an f*-approximation to the optimal solution I*, in which case the algorithm terminates. The iterative procedure that has been just described lies at the heart of any primal-dual algorithm.

One thing to note here is that despite the fact that only local improvements are applied to both the primal and dual solutions during the algorithm, an almost globally optimal solution is extracted at the end. Also, instead of working directly with the primal and dual costs, typically one works with the complementary slackness conditions associated with the linear program. These conditions are thus relaxed by a certain factor f* and then one has to find a primal-dual pair (x, y) that satisfies these relaxed conditions. This can be shown to be the same as trying to make the primal-dual gap smaller than f*, as the following theorem certifies:

THEOREM 2 (Relaxed Complementary Slackness). If the pair (x, y) of integral-primal and dual feasible solutions satisfies the so-called relaxed primal complementary slackness conditions:

$$\forall x_j > 0 \Rightarrow \sum_{i=1}^{m} a_{ij} y_i \geq c_j / f_j, \quad (6)$$

where $f^* = \max_j f_j$, then the primal-dual gap for the pair (x, y) is smaller than f* and therefore x is an f*-approximation to the optimal integral solution.

Based on this theorem, as well as on all of the previous observations, the following iterative schema can thus be applied during a primal-dual based approximation algorithm.

THEOREM 3 (The primal-dual schema). Keep generating pairs of integral-primal, dual solutions $\{(x^k, y^k)\}_{k=1}^{t}$ until the elements $x^t$, $y^t$ of the last pair are both feasible and satisfy the relaxed primal complementary slackness conditions.

Note that one can derive different approximation algorithms simply by using different relaxations of the complementary slackness conditions, for example by using different $f_j$ in EQ. (6).

Applying the Primal-dual Schema to MRF Optimization

Using the above schema, MRF optimization can be cast in terms of integer programming as follows.

$$\min \sum_{p \in V} \left( \sum_{a \in L} c_p(a) x_p(a) \right) + \sum_{(p,q) \in E} \left( w_{pq} \sum_{a,b \in L} d(a,b) x_{pq}(a,b) \right), \quad (7)$$

$$\text{s.t.} \sum_a x_p(a) = 1 \quad \forall p \in V,$$

$$\sum_a x_{pq}(a,b) = x_q(b) \quad \forall b \in L, (p,q) \in E,$$

$$\sum_b x_{pq}(a,b) = x_p(a) \quad \forall a \in L, (p,q) \in E,$$

$$x_p(\ ), x_{pq}(,) \in \{0, 1\}.$$

As can be seen, the MRF energy function has been linearized by introducing two types of extra indicator (i.e, binary) variables: the unary variables $\{x_p(\ )\}$, that are used for indicating which label is assigned to each MRF node (i.e., $x_p(a) = 1 \Leftrightarrow$ label a has been assigned to p), as well as the pairwise variables $\{x_{pq}(,)\}$, that are used for indicating which pair of labels is assigned to each pair of neighboring nodes (i.e., $x_{pq}(a, b) = 1 \Leftrightarrow$ labels a, b have been assigned to nodes p, q). Of course, to obtain an equivalent formulation to the MRF optimization, one also needs to impose the additional linear constraints from EQS. (7) on these binary variables. The first of those constraints encodes the fact that only one label can be assigned to each node, while the remaining constraints enforce consistency between the unary and the pairwise variables in the sense that they ensure that if $x_p(a) = x_q(b) = 1$, then it should hold $x_{pq}(a, b) = 1$ as well. If the indicator variables are assumed to satisfy all of the above constraints, then it can be verified that the above linear integer program is indeed equivalent to the original program of minimizing the MRF energy. Given this fact, one can apply the primal-dual schema to it. This means that one can relax the integrality constraints to the constraints $x_p(\ )\geq 0$; $x_{pq}(,)\geq 0$, take the dual to the resulting linear program and choose a proper relaxation of the complementary slackness conditions.

FIG. 2(c) illustrates the application of a primal-dual schema to the case of MRF optimization. One ends up computing a sequence of MRF energies (these correspond to the primal costs), as well as a sequence of lower bounds on the unknown minimum MRF energy (these bounds corresponds to the dual costs). After performing the related analysis, each iteration of the primal-dual schema (i.e., each update of the primal and the dual variables) reduces to solving a max-flow system for a certain capacitated graph.

Figure 3:
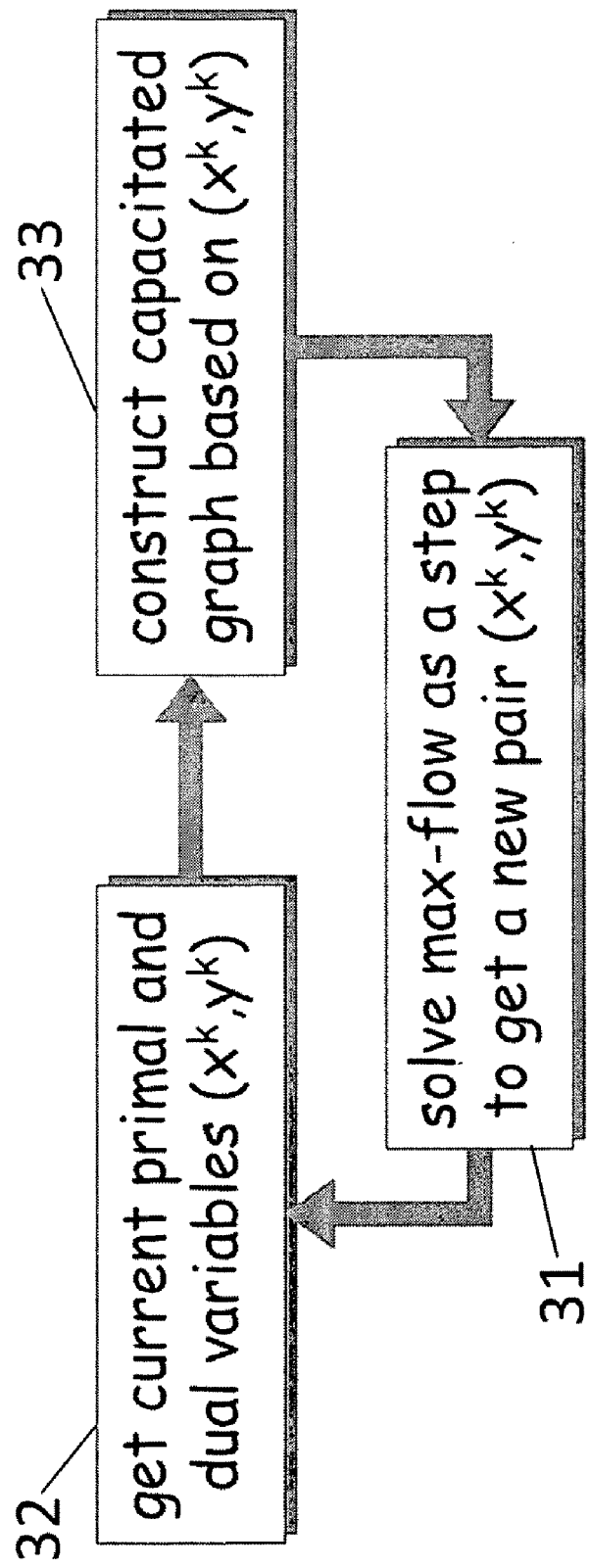
FIG. 3 illustrates an iterative scheme for MRF optimization, according to an embodiment of the invention.

FIG. 3 illustrates an iterative scheme for MRF optimization. Each iteration of the primal-dual schema essentially involves solving at step 31 a max-flow system for a capacitated graph that is constructed based on the current pair ($x^k$, $y^k$) of primal and dual variables. The resulting flows guide the update at step 32 of the primal, as well as the dual variables to get a new pair ($x^k$, $y^k$) to construct at step 33 another capacitated graph for the next iteration at step 31. Also, note that this max-flow graph is not static, but changes per iteration. In fact, its construction depends on the current primal-dual pair of solutions, say ($x^k$, $y^k$). This implies that both the connectivity of that graph, as well as the capacities of its edges are defined based on this pair ($x^k$, $y^k$). Furthermore, by choosing to use different relaxations of the resulting complementary slackness conditions, different approximation algorithms can be derived in this manner, all of which are capable of handling a wide variety of MRFs with metric, as well as non-metric pairwise potential functions. In addition, since in every case the generated solutions provably satisfy a chosen set of relaxed complementary slackness conditions, worst-case (i.e, theoretical) guarantees about the optimality of these solutions can always be provided.

For the sake of simplicity, this disclosure will describe one exemplary choice of relaxed complementary conditions, but it should be noted that the techniques described herein are non-limiting and apply equally well to all relaxed complementary slackness conditions. In particular, this disclosure will focus here on the following conditions:

$$h_p(x_p) = \min_{a \in L} h_p(a), \forall p \in V, \quad (8)$$

$$y_{pq}(x_p) + y_{qp}(x_p) = w_{pq} d(x_p, x_q), \forall pq \in E, \quad (9)$$

$$y_{pq}(a) + y_{qp}(b) \leq 2 w_{pq} d_{max}, \forall pq \in E, a \in L, b \in L. \quad (10)$$

In these formulae, the primal variables, denoted by $x = \{x_p\}_{p \in V}$, determine the labels assigned to nodes (called active labels hereinafter), e.g. $x_p$ is the active label of node p. Whereas, the dual variables are divided into balance and height variables. There exist two balance variables $y_{pq}(a)$, $y_{qp}(a)$ per edge (p, q) and label a, as well as one height variable $h_p(a)$ per node p and label a. Variables $y_{pq}(a)$; $y_{qp}(a)$ are also called conjugate and, for the dual solution to be feasible, these must be set opposite to each other, i.e.: $y_{qp}(\ ) \equiv -y_{pq}(\ )$.

If the above conditions hold true then the solution x defines a labeling which is an f*-approximation to the optimal labeling of the MRF, where $$f^* = 2 \frac{d_{max}}{d_{min}},$$

$d_{max} \equiv \max_{a,b} d(a, b)$ and $d_{min} \equiv \min_{a \neq b} d(a, b)$.

Note that the height variables can be defined in terms of the balance variables as follows:

$$h_p(\ ) \equiv c_p(\ ) + \sum_{q: qp \in E} y_{pq}(\ ). \quad (11)$$

Due to EQ. (11), only the vector y (of all balance variables) is needed for specifying a dual solution. In addition, for the simplifying conditions in EQS. (8), one can also define:

$$\text{load}_{pq}(a,b) \equiv y_{pq}(a) + y_{qp}(b). \quad (12)$$

Using the above definition, the conditions in EQS. (8) can then be simplified as follows:

$$\text{load}_{pq}(x_p, x_q) = w_{pq} d(x_p, x_q), \forall pq \in E,$$

$$\text{load}_{pq}(a,b) \leq 2 w_{pq} d_{max}, \forall pq \in E, a \in L, b \in L. \quad (13)$$

The primal and the dual variables are, of course, iteratively updated until all EQS. (8) hold true, i.e., until the chosen relaxed complementary slackness conditions are satisfied, the main goal of the primal-dual algorithm for MRF optimization.

FIG. 4 depicts pseudocode illustrating the basic structure of such an algorithm according to an embodiment of the invention. The internal variables are initialized in line 1. During an inner iteration (lines 3-6), referred to herein as a c-iteration, a label c is selected and a new primal-dual pair of solutions (x', y') is generated based on the current pair (x, y). To this end, among all balance variables $y_{pq}(\ )$, only the balance variables of c-labels (i.e. $y_{pq}(c)$) are updated during a c-iteration. |L| such iterations (i.e one c-iteration per label c in L) make up an outer iteration (lines 2-7), and the algorithm terminates if no change of label takes place at the current outer iteration.

During an inner iteration, the main update of the primal and dual variables takes place inside UPDATE DUALS PRIMALS, and (as already mentioned) this update reduces to solving a max-flow in a capacitated graph, which will be denoted by $G^c$ hereafter. Furthermore, the routines PREEDIT DUALS and POSTEDIT DUALS apply corrections to the dual variables before and after this main update, i.e. to variables y and y' respectively. Note that in this disclosure, the following convention will be used for the notation of the dual variables during an inner-iteration: before the UPDATE DUALS PRIMALS routine, all dual variables are denoted without an accent, e.g. $y_{pq}(\ )$, $h_p(\ )$. After UPDATE DUALS PRIMALS has updated the dual variables, always use an accent for denoting these variables, e.g. write $y'_{pq}(\ )$, $h'_p(\ )$ in this case.

For reasons of brevity, a primal-dual optimization algorithm according to an embodiment of the invention will be referred to herein below as a PD3$_a$ algorithm.

Fast Primal-Dual MRF Optimization

The complexity of the PD3$_a$ primal-dual method largely depends on the complexity of all max-flow instances (one instance per inner-iteration), which, in turn, depends on the number of augmentations per max-flow. So, for designing faster primal-dual algorithms, one first needs to understand how the graph $G^c$, associated with the max-flow at a c-iteration of PD3$_a$, is constructed.

Figure 5:
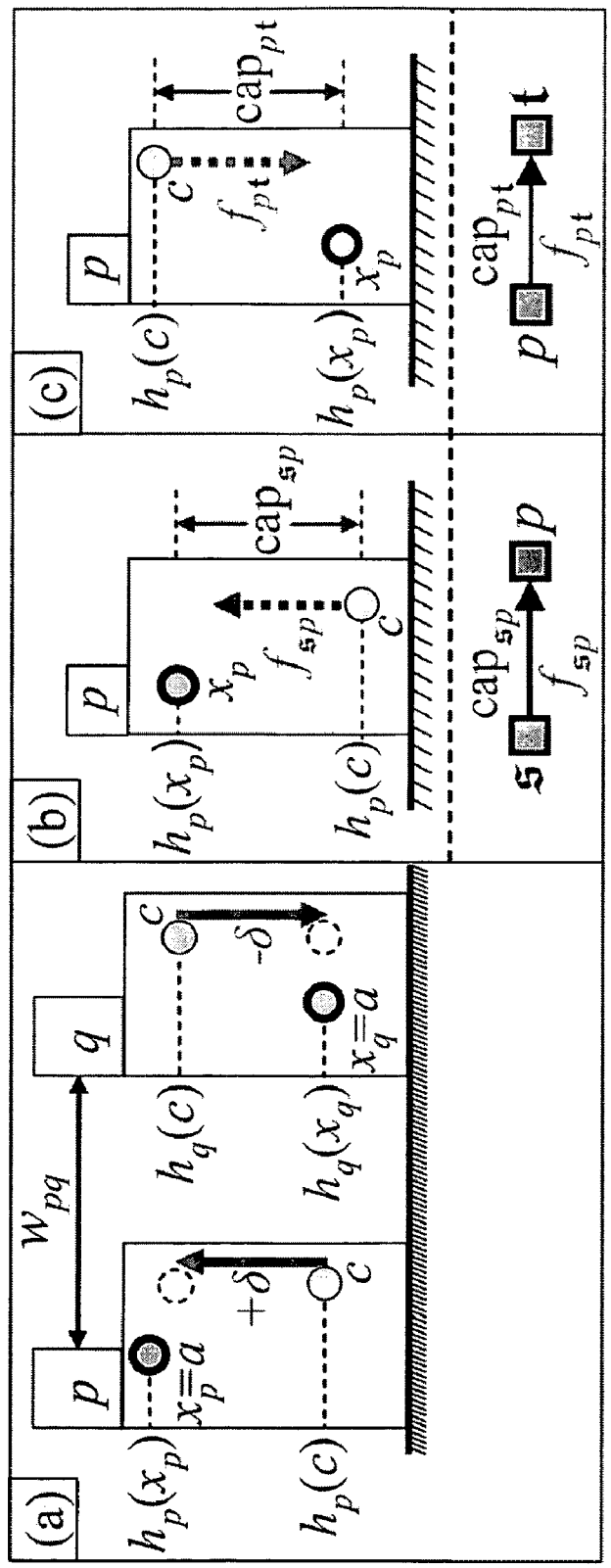
FIGS. 5(a)-(c) illustrate an intuitive interpretation of the dual variables for a simple MRF with 2 nodes and 2 labels, according to an embodiment of the invention.

To this end, consider the following intuitive interpretation of the dual variables, illustrated in FIG. 5(a) for a simple MRF with 2 nodes {p, q} connected by an edge pq weighted by $w_{pq}$, and 2 labels {a, c}. Active labels are drawn with a thicker circle. For each node p, a separate copy of all labels in L is considered, and all these labels are represented as balls, which float at certain heights relative to a reference plane. The role of the height variables $h_p(\ )$ is then to specify the balls' height. For example, the height of label a at node p is given by $h_p(a)$. Also, expressions like "label a at p is below/above label b" imply $h_p(a) </> h_p(b)$. Furthermore, balls are not static, but may move (change their heights) in pairs through updating pairs of conjugate balance variables. For example, in FIG. 5(a), label c at p is raised by +δ (due to adding +δ to $y_{pq}(c)$), and so label c at q has to move down by −δ (due to adding −δ to $y_{qp}(c)$ so that condition $y_{pq}(c) = -y_{qp}(c)$ still holds). Therefore, the role of balance variables is to raise or lower labels. In particular, the value of balance variable $y_{pq}(a)$ represents the partial raise of label a at p due to edge pq, while the total raise of a at p equals the sum of partial raises from all edges of G incident to p.

Hence, a $PD3_a$ algorithm according to an embodiment of the invention iteratively moves labels up or down, until all conditions in EQS. (8)-(10) hold true. To this end, it uses the following strategy: it ensures that EQS. (9) and (10) hold at each iteration, and is just left with making the labels' heights satisfy the condition of EQ. (8) (referred to hereinafter as the height condition) in the end, which requires each active label $x_p$ to be the lowest label for p.

Figure 6:
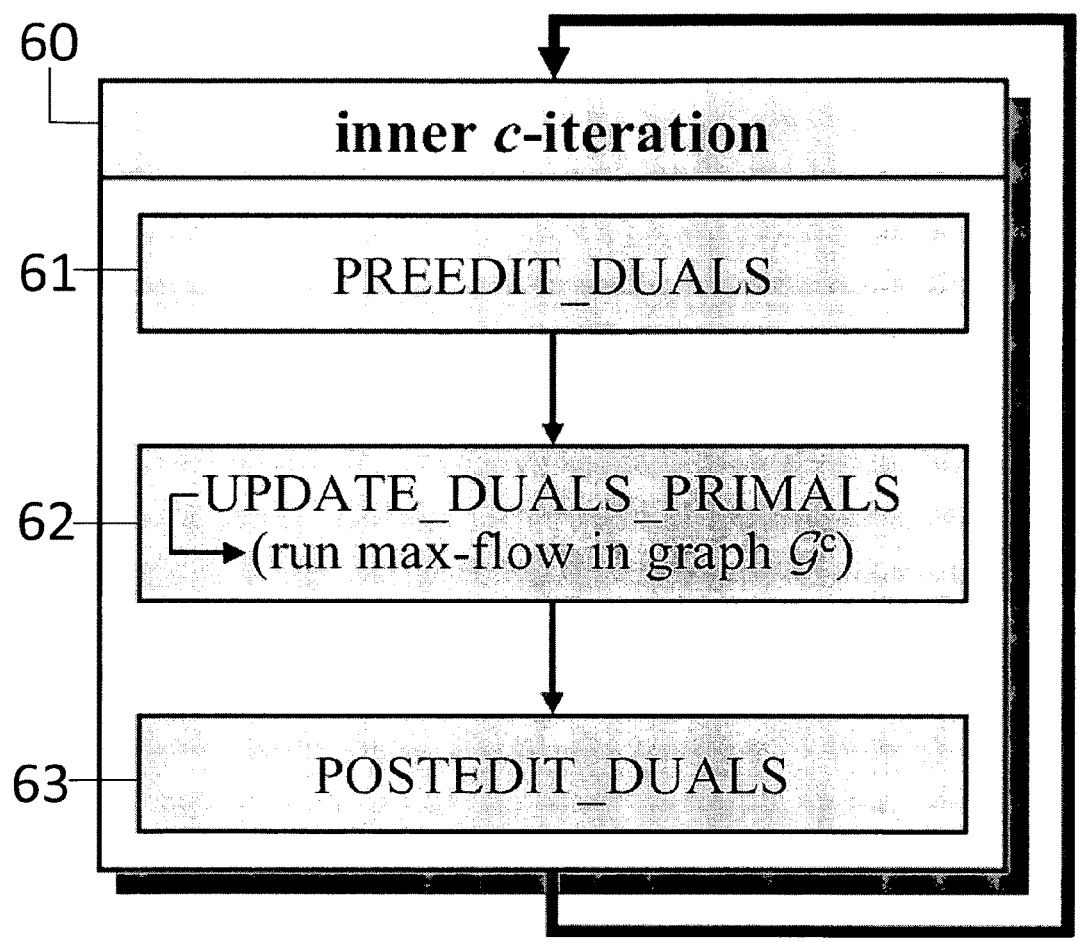
FIG. 6 is a block diagram illustrating the basic structure of an inner c-iteration, according to an embodiment of the invention

For this purpose, labels are moved in groups. FIG. 6 illustrates the basic structure of an inner c-iteration of FIG. 4. In particular, during an inner c-iteration 60 only the c-labels are allowed to move. Furthermore, the main movement of all c-labels (i.e. the main update of dual variables $y_{pq}(c)$ and $h_p(c)$ for all p, q) takes place in UPDATE DUALS PRIMALS routine at step 62, and this movement is simulated by pushing the maximum flow through an appropriate directed graph $G^c$, which is constructed based on the current primal-dual pair (x, y) during a c-iteration. The nodes of $G^c$ include all nodes of graph G (the internal nodes), plus two external nodes, the source s and the sink t. Besides the movement during UPDATE DUALS PRIMALS, c-labels also move before, in routine PREEDIT DUALS at step 61, and after, in routine POSTEDIT DUALS at step 63, that routine as well. Routines PREEDIT DUALS and POSTEDIT DUALS also apply corrections to the dual variables.

In addition, all nodes of $G^c$ are connected by two types of edges: interior and exterior edges. Interior edges come in pairs pq, qp, with one such pair for every 2 neighbors p, q in G, and are responsible for updating the balance variables during UPDATE DUALS PRIMALS. In particular, the corresponding flows $f_{pq}/f_{qp}$ represent the increase/decrease of balance variable $y_{pq}(c)$, i.e., $y'_{pq}(c) = y_{pq}(c) + f_{pq} - f_{qp}$.

But for now, to understand how to make a faster primal-dual method, it is the exterior edges, which represent the update of height variables during UPDATE DUALS PRIMALS, as well as their capacities, which ensure the height condition on their own, that are of interest. The reason is that these edges determine the number of s-linked nodes, which, in turn, affects the number of augmenting paths per max-flow. FIG. 5(b) represents the situation where label c is below $x_p$ during a c-iteration, and FIG. 5(c) represents the situation where label c is above $x_p$. In particular, each internal node connects to either the source s (i.e., it is an s-linked node) or to the sink t (i.e., it is a t-linked node) through one of these exterior edges, and this is done to ensure the height condition as follows.

Referring to FIG. 5(c), if label c at p is above $x_p$ during a c-iteration (i.e. $h_p(c) > h_p(x_p)$), then label c should not go below $x_p$, or else the height condition will be violated for p. Node p thus connects to t through directed edge pt, i.e. p becomes t-linked, as indicated at the bottom of the figure, and flow $f_{pt}$ is defined to represent the total decrease in the height of c during UPDATE DUALS PRIMALS, i.e. $h'_p(c) = h_p(c) - f_{pt}$. Furthermore, a capacity of edge pt can be defined so that label c will still remain above $x_p$, i.e. $cap_{pt} = h_p(c) - h_p(x_p)$.

On the other hand, referring to FIG. 5(b), if label c at p is below active label $x_p$ (i.e. $h_p(c) < h_p(x_p)$), then due to the height condition label c should raise so as to reach $x_p$, and so p connects to s through edge sp, i.e. p becomes s-linked, as indicated at the bottom of the figure, while flow $f_{sp}$ is defined to represent the total raise of ball c, i.e. $h'_p(c) = h_p(c) + f_{sp}$. In this case, one also defines the capacity as $cap_{sp} = h_p(x_p) - h_p(c)$.

This way, by pushing flow through the exterior edges of $G^c$, all c-labels that are strictly below an active label try to raise and reach that label during UPDATE DUALS PRIMALS. Equivalently, if c-label at p cannot raise high enough to reach $x_p$, UPDATE DUALS PRIMALS then assigns that c-label as the new active label of p (i.e. $x'_p = c$), thus effectively making the active label go down. This once again helps the height condition to become true, and forms a rationale behind the update of the primal variables x in UPDATE DUALS PRIMALS. In addition, the fewer are the c-labels below an active label (i.e. the fewer are the s-linked nodes), the fewer will be the edges connected to the source, and thus there will be fewer possible augmenting paths. In fact, an algorithm according to an embodiment of the invention terminates when, for any label c, there are no more c-labels strictly below an active label (i.e. no s-linked nodes exist and thus no augmenting paths may be found), in which case the height condition will hold true, as desired. Put another way, UPDATE DUALS PRIMALS tries to push c-labels (which are at a low height) up, so that the number of s-linked nodes is reduced and thus leaving fewer possible augmenting paths for the next iteration.

Figure 7:
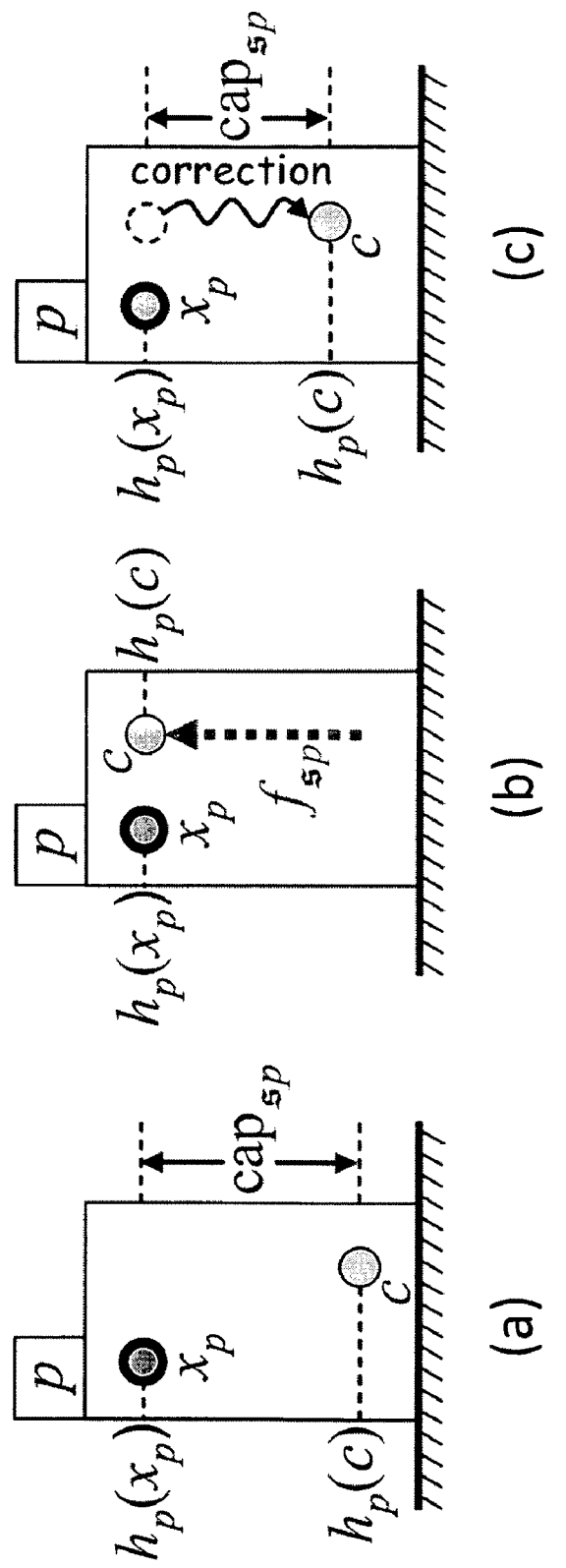
FIGS. 7(a)-(c) illustrate how the routines PREEDIT DUALS or POSTEDIT DUALS affect the number of s-linked nodes, according to an embodiment of the invention.

However, although UPDATE DUALS PRIMALS tries to reduce the number of s-linked nodes (by pushing the maximum amount of flow), PREEDIT DUALS or POSTEDIT DUALS very often spoil that progress. This occurs because, to restore the condition of EQ. (9), which is their purpose, these routines apply corrections to the dual variables (i.e to the labels' height). The only point where a new s-linked node can be created is during either PREEDIT DUALS or POSTEDIT DUALS. FIGS. 7(a)-(c) illustrate how the routines PREEDIT DUALS or POSTEDIT DUALS affect the number of s-linked nodes. Referring to the figures, FIG. 7(a) depicts a situation where label c at p is below $x_p$, and thus label c is allowed to raise itself to reach $x_p$. This means that p will be an s-linked node of graph $G^c$, i.e. $cap_{sp} > 0$, and thus a non-zero flow $f_{sp}$, representing the total raise of label c in UPDATE DUALS PRIMALS, may pass through edge sp. Therefore, in this case, edge sp may become part of an augmenting path during max-flow. FIG. 7(b) depicts the situation after UPDATE DUALS PRIMALS, i.e. after max-flow, label c has risen by $f_{sp}$ and reach $x_p$. Since it cannot go higher than that, no flow can pass through edge sp, i.e $cap_{sp} = 0$, and so no augmenting path may traverse that edge thereafter. FIG. 7(c) depicts the situation after a correction by PREEDIT DUALS or POSTEDIT DUALS. Due to this correction, label c has dropped below $x_p$ once more and p has become an s-linked node again, i.e. $cap_{sp} > 0$. Edge sp can thus be part of an augmenting path again, as in FIG. 7(a).

To address this situation, PREEDIT DUALS and POSTEDIT DUALS will be redefined so that they can now ensure condition (9) by using just a minimum number of corrections for the dual variables, (e.g. by touching these variables only rarely). To this end, however, UPDATE DUALS PRIMALS needs to be modified as well. FIG. 8 depicts pseudocode for a modified algorithm according to an embodiment of the invention. The resulting algorithm, called Fast-PD, carries the following differences over PD3$_a$ during a c-iteration. An algorithm according to an embodiment of the invention begins by randomly assigning labels to x and initializing y to zero, and, for all edges pq, by adjusting balance variables $y_{pq}(x_p)$ or $y_{qp}(x_q)$ so that $\text{load}_{pq}(x_p, x_q) = w_{pq}d(x_p, x_q)$ in routine INIT_DUALS_PRIMALS.

A new PREEDIT DUALS modifies a pair $y_{pq}(c)$, $y_{qp}(c)$ of dual variables only when absolutely necessary. So, whereas a previous version modified these variables, thereby changing the height of a c-label, whenever $c \neq x_p$, $c \neq x_q$, which could happen often, a modification is now applied only if $\text{load}_{pq}(c, x_q) > w_{pq}d(c, x_q)$ or $\text{load}_{pq}(x_p, c) > w_{pq}d(x_p, c)$, as shown in FIG. 8. In practice, this happens more rarely. In this case, a modification is needed, because the above inequalities indicate that condition (9) will be violated if either (c, $x_q$) or ($x_p$, c) become the new active labels for p, q. On the contrary, no modification is needed if the following inequalities are true:

$$\text{load}_{pq}(c, x_q) \leq w_{pq}d(c, x_q), \text{load}_{pq}(x_p, c) \leq w_{pq}d(x_p, c),$$

because then, as will be shown below, the new UPDATE DUALS PRIMALS can always restore condition (9) even if (c, $x_q$) or ($x_p$, c) are the next active labels. In fact, the modification to $y_{pq}(c)$ that is occasionally applied by the new PREEDIT DUALS can be shown to be the minimal correction that restores exactly the above inequalities, assuming, of course, this restoration is possible.

Similarly, the balance variables $y'_{pq}(x'_p)$ (with $x'_p = c$) or $y'_{qp}(x'_q)$ (with $x'_q = c$) are modified much more rarely by the new POSTEDIT DUALS. So, again referring to FIG. 8, whereas a previous version modified these variables, thereby changing the height of a c-label, whenever they were negative, which could happen most of the time, the new routine applies a modification only if $\text{load}'_{pq}(x'_p, x'_q) > w_{pq}d(x'_p, x'_q)$, where one defines $\text{load}'_{pq}(a, b) \equiv y'_{pq}(a) + y'_{qp}(b)$ for variable y which may happen only occasionally, e.g. if the distance function d(,) is a metric, one may then show that this can never happen. If the above inequality does hold true, then POSTEDIT DUALS simply needs to reduce $\text{load}'_{pq}(x'_p, x'_q)$ so as to restore condition (9).

But, to allow for the above changes, the construction of graph $G^c$ in UPDATE DUALS PRIMALS needs to be modified. In particular, for $c \neq x_p$ and $c \neq x_q$, the capacities of interior edges pq, qp will be defined as follows:

$$\text{cap}_{pq} = [w_{pq}d(c, x_q) - \text{load}_{pq}(c, x_q)]^+, \quad (14)$$

$$\text{cap}_{qp} = [w_{pq}d(x_p, c) - \text{load}_{pq}(x_p, c)]^+, \quad (15)$$

where $[x]^+ \equiv \max(x, 0)$. Note that if $c = x_p$ or $c = x_q$, then $\text{cap}_{pq} = \text{cap}_{qp} = 0$ as before. Besides ensuring the condition of EQ. (10), by not letting the balance variables increase too much, the above definition of interior capacities helps ensure that (after max-flow) condition (9) will be met by most pairs (p, q), regardless of whether (c, $x_q$) or ($x_p$, c) are the next labels assigned to them, which will help avoid the need for a correction by POSTEDIT DUALS for all but a few p, q. To see this, observe that if, say, (c, $x_q$) are the next labels for p and q, then capacity $\text{cap}_{pq}$ can be shown to represent the increase of $\text{load}_{pq}(c, x_q)$ after max-flow, i.e.:

$$\text{load}'_{pq}(c, x_q) = \text{load}_{pq}(c, x_q) + \text{cap}_{pq}. \quad (16)$$

Hence, if the following inequality is true as well:

$$\text{load}_{pq}(c, x_q) \leq w_{pq}d(c, x_q), \quad (17)$$

then condition (9) will do remain valid after max-flow, as the following derivation shows:

$$\begin{aligned}\text{load}'_{pq}(c, x_q) &= \text{load}_{pq}(c, x_q) + [w_{pq}d(c, x_q) - \text{load}_{pq}(c, x_q)]^+ \\ &= \text{load}_{pq}(c, x_q) + [w_{pq}d(c, x_q) - \text{load}_{pq}(c, x_q)] \\ &= w_{pq}d(c, x_q).\end{aligned} \quad (18)$$

But this means that a correction may need to be applied by POSTEDIT DUALS only for pairs p, q violating (17) (before max-flow). However, such pairs tend to be very rare in practice (e.g., as one can prove, no such pairs exist when d(,) is a metric), and thus very few corrections need to take place.

FIG. 9 is a table that summarizes how a Fast-PD according to an embodiment of the invention sets the capacities for all edges of $G^c$, based on the foregoing discussion. The exterior capacities are defined as $\text{cap}_{sp} = [h_p(x_p) - h_p(c)]^+$ and $\text{cap}_{pt} = [w_p(c) - h_p(x_p)]^+$ for an s-link and a t-link, respectively. For the interior capacities, if $x_p \neq c$ and $x_q \neq c$, then $\text{cap}_{pq} = [w_{pq}d(c, x_q) - \text{load}_{pq}(c, x_q)]^+$ and $\text{cap}_{qp} = [w_{pq}d(x_p, c) - \text{load}_{pq}(x_p, c)]^+$, otherwise, for $x_p = c$ or $x_q = c$, then $\text{cap}_{pq} = 0$ and $\text{cap}_{qp} = 0$. As already mentioned, based on the interior capacities, one may show that UPDATE DUALS PRIMALS, with the help of PREEDIT DUALS, POSTEDIT DUALS in a few cases, ensures conditions (9), (10), while, due to the exterior capacities, UPDATE DUALS PRIMALS can ensure condition (8). As a result, the next theorem holds (see below for a complete proof):

THEOREM 4. The last primal-dual pair (x, y) of a Fast-PD according to an embodiment of the invention satisfies conditions (8)-(10), and so x is an $f_{app}$-approximate solution.

A Fast-PD according to an embodiment of the invention maintains the optimality properties of a PD3$_a$ method according to an embodiment of the invention. For example, for a metric d(,), a Fast-PD according to an embodiment of the invention proves to be as powerful as an α-expansion (see below for a proof):

THEOREM 5. If d(,) is a metric, then a Fast-PD algorithm according to an embodiment of the invention computes the best c-expansion after any c-iteration.

Efficiency of Fast-PD for Single MRFs

Besides having these optimality properties, a Fast-PD according to an embodiment of the invention is also more efficient in practice than previous primal-dual methods.

Figure 10A:
FIGS. 10(a)-(f) depict three pairs of images showing image restoration and stereo matching results by a fast-PD algorithm according to an embodiment of the invention.
Figure 10B:
Figure 10C:
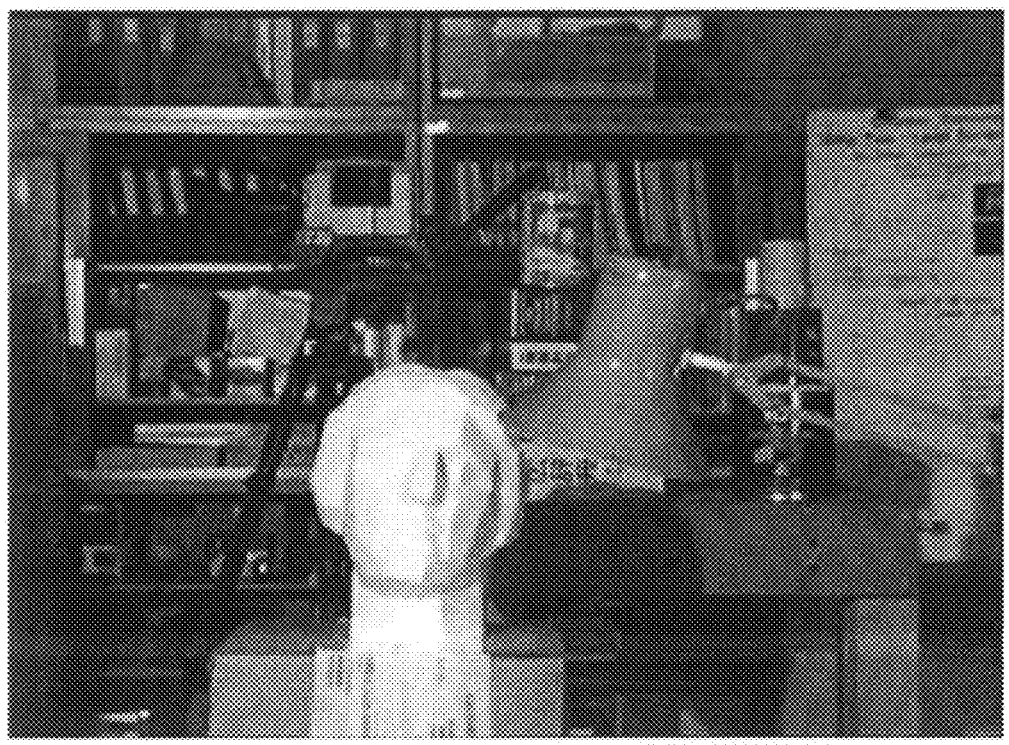
Figure 10D:
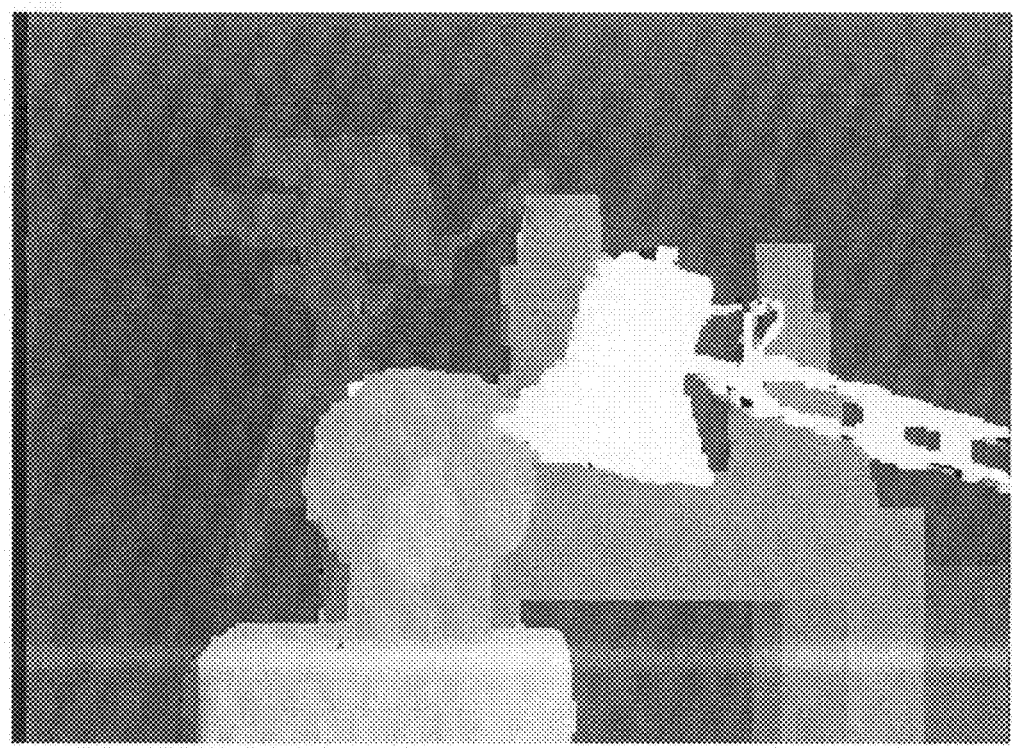
Figure 10E:
Figure 10F:
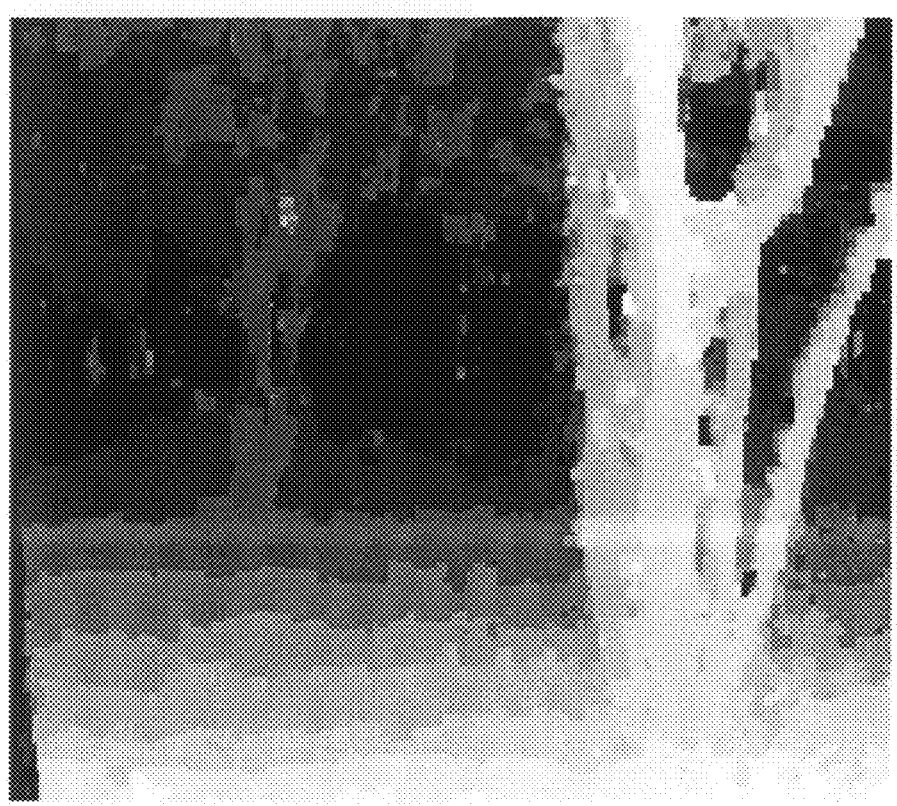

The computational efficiency for all methods of this kind is largely determined by the time taken by each max-flow part, which, in turn, depends on the number of augmenting paths that need to be computed. For the case of a Fast-PD, the number of augmentations per inner-iteration decreases as the algorithm progresses. FIGS. 10(a)-(f) depicts three pairs of images showing image restoration and stereo matching results by a fast-PD algorithm according to an embodiment of the invention. In the image restoration case, given an image corrupted by Gaussian noise, shown in FIG. 10(a), one seeks to restore the original (uncorrupted) image. In this case, labels correspond to intensities, while the singleton potential function $c_p(\cdot)$ was defined as a truncated squared difference $c_p(a) = \min\{|I_p - a|^2; 10^4\}$ between the label and the observed intensity $I_p$ at pixel p. FIG. 10(b) shows a restoration result of denoising the corrupted "penguin" image of FIG. 10(a) using a Fast-PD method according to an embodiment of the invention. 256 labels were used with a truncated quadratic distance $d(a,b) = \min(|a-b|^2, D)$, where D=200. For the stereo matching case, the conventional measure of SSD (sum of squared differences) or SAD (sum of absolute differences) has been used for the singleton potentials $c_p(\ )$. FIG. 10(d) shows the corresponding disparity, of size 384×288 with 16 labels, for the Tsukuba image in FIG. 10(c), while FIG. 10(f) shows the resulting disparity, of size 256×233 with 10 labels, for an image, shown in FIG. 10(e), from the "SRI tree" sequence. In both cases, a truncated linear distance d(a, b)=min(|a−b|, D) with D=2 and D=5, respectively, has been used, while the weights $w_{pq}$ were allowed to vary based on the image gradient at p.

Figure 12:
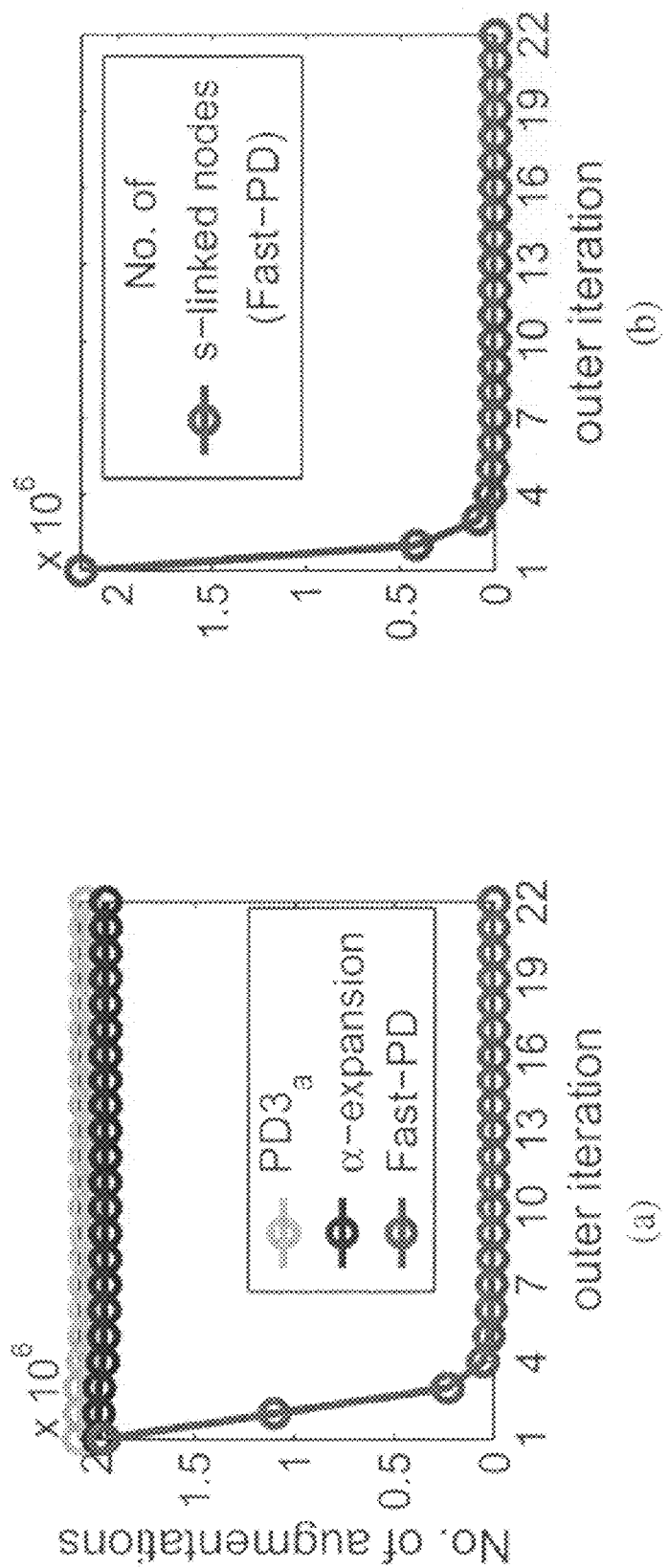
FIG. 12(a) shows the corresponding number of augmenting paths per outer-iteration, according to an embodiment of the invention.
FIG. 12(b) depicts a graph showing how the number of augmentations of Fast-PD is directly related to the decreasing number of s-linked nodes per outer-iteration, according to an embodiment of the invention.

FIG. 12(a) shows the corresponding number of augmenting paths per outer-iteration, that is, per group of |L| inner-iterations. Notice that, for both an α-expansion as well as a $PD3_a$ according to an embodiment of the invention, this number remains high (almost over $2×10^6$ paths) throughout all iterations. On the contrary, for the case of a Fast-PD according to an embodiment of the invention, it drops towards zero quickly, e.g. only 4905 and 7 paths had to be found during the $8^{th}$ and last outer-iteration, respectively. In fact, for the case of a Fast-PD according to an embodiment of the invention, it is very typical that, after very few inner-iterations, only a very small number of augmenting paths need to be computed per max-flow, which boosts the performance in this case. FIG. 12(b) depicts a graph showing how the number of augmentations of Fast-PD is directly related to the decreasing number of s-linked nodes per outer-iteration (this number is shown here for the same example as in FIG. 12(a)).

This property can be explained by the fact that Fast-PD maintains both a primal, as well as a dual solution at each iteration. Fast-PD effectively uses this pair of primal and dual solutions from the previous iteration so as to reduce the number of augmenting paths for the next iteration. FIGS. 11(a)-(b) are high level illustrations comparing the use of primal-dual solutions by a Fast-PD algorithm according to an embodiment of the invention to an α-expansion algorithm. Referring now to FIG. 11(a), intuitively, Fast-PD closes the gap between the primal and the dual cost (see Theorem 1), and, iteratively generates primal-dual pairs, to continuously decrease the size of this gap. But, for Fast-PD, the gap's size can be thought of as, roughly speaking, a rough estimation for the number of augmenting paths per inner-iteration (see Theorem 7 below). Therefore, since a Fast-PD according to an embodiment of the invention reduces this gap throughout its execution, the number of augmenting paths decreases over time as well, which, in turn, results in improving the efficiency of the max-flow part (recall that a path augmenting max-flow algorithm works by keep finding augmenting paths until there are no more of them).

Referring now to FIG. 11(b), a method like an α-expansion, that works only in the primal domain, ignores dual solutions completely. It is as if the α-expansion is resetting the dual solution to zero at the start of each inner-iteration, thus effectively forgetting that solution thereafter. For this reason, it fails to substantially reduce the primal-dual gap and thus also fails to achieve a reduction in path augmentations over time, i.e. across inner-iterations. This, of course, has as a result that more time is needed per iteration. However, not only the α-expansion, but also the $PD3_a$ algorithm fails to mimic the behavior of a Fast-PD according to an embodiment of the invention, despite being a primal-dual method. As explained above, this happens because, in this case, PRE-EDIT DUAL and POSTEDIT DUAL temporarily destroy the gap just before the start of UPDATE DUALS PRIMALS, i.e just before max-flow is about to begin computing the augmenting paths. Note that this destruction is only temporary, and the gap is restored again after the execution of UPDATE DUALS PRIMALS. The above mentioned relationship between the primal-dual gap and the number of augmenting paths is formally described in the next theorem, proved below.

THEOREM 6. For a Fast-PD algorithm according to an embodiment of the invention, the primal-dual gap at the current inner-iteration forms an approximate upper bound for the number of augmenting paths at each iteration thereafter.

Figures 13A, 13B:
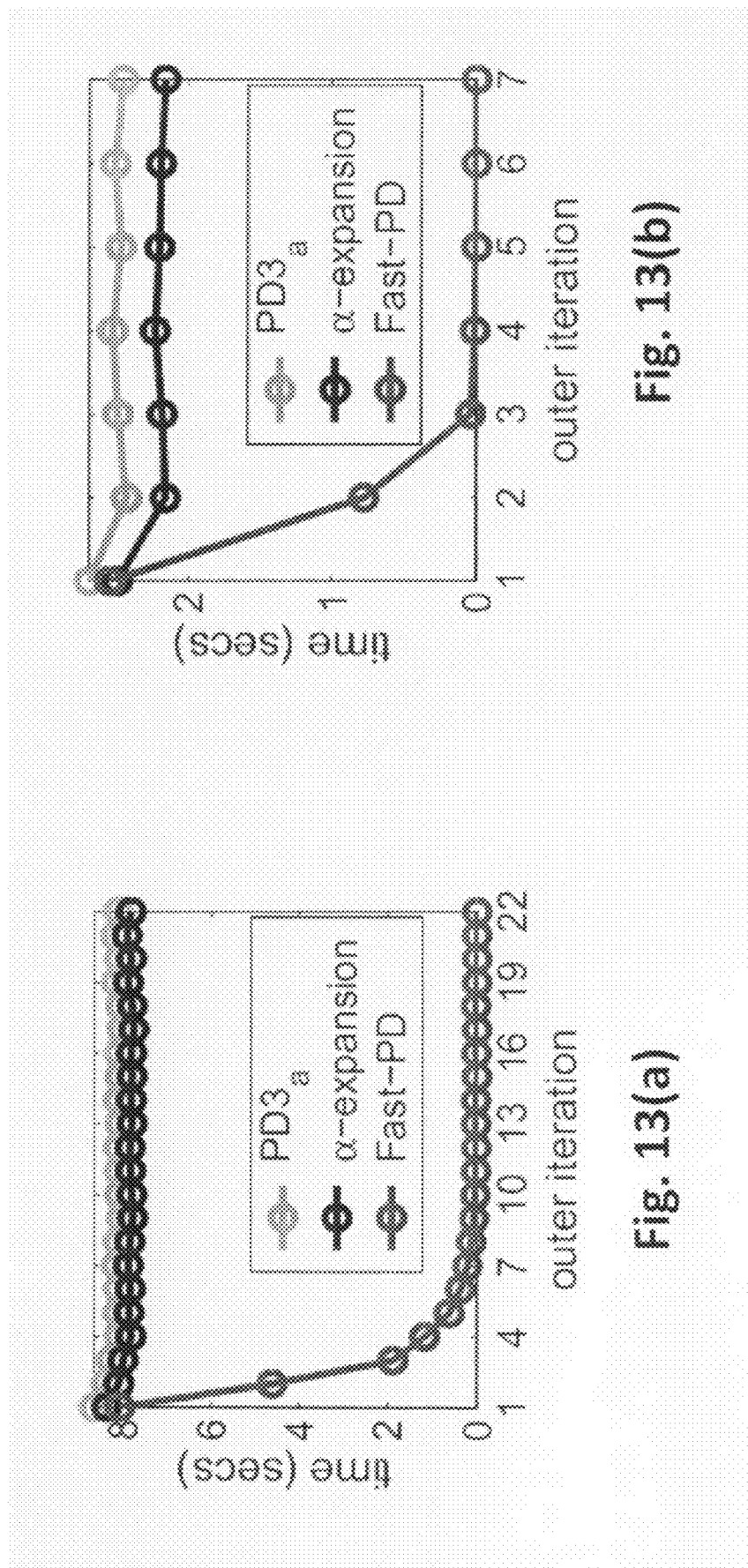

Due to the above mentioned property, the time per outer-iteration decreases over time. This has been verified experimentally with virtually all examples on which a Fast-PD algorithm according to an embodiment of the invention has been tested. FIGS. 13(a)-(c) are graphs of the total time per outer iteration for the (a) "penguin", (b) "Tsukuba" and (c) "SRI tree" examples of FIGS. 10(a)-(f), and FIG. 13(d) compares the resulting total running times for the same examples. Note that for all experiments reported herein, a 1.6 GHz laptop has been used. The outer-iterations of a Fast-PD become faster as the algorithm progresses, e.g. the last outer-iteration of a Fast-PD (for the "SRI-tree" example) lasted less than 1 msec, since, as it turns out, only 4 augmenting paths had to be found during that iteration. Contrast this with the behavior of either the α-expansion or the $PD3_a$ algorithm, which both require an almost constant amount of time per outer-iteration, e.g. the last outer-iteration of α-expansion needed more than 0.4 secs to finish. Similarly, for the "Tsukuba" example, the α-expansion's last outer-iteration was more than 2000 times slower than a Fast-PD's iteration according to an embodiment of the invention.

Max-flow Algorithm Adaptation

However, for fully exploiting the decreasing number of path augmentations and reduce the running time, one also has to properly adapt the max-flow algorithm. A max-flow method suitable for use with an embodiment of the invention is disclosed in Y. Boykov and V. Kolmogorov, "An experimental comparison of min-cut/max-flow algorithms for energy minimization in vision", IEEE Transactions on Pattern Analysis and Machine Intelligence (PAMI), 26(9), 2004, the contents of which are herein incorporated by reference in their entirety, and is more fully described below following the proof of Theorem 7. To adapt the algorithm, observe that the decreasing number of augmentations is directly related to the decreasing number of s-linked nodes, as already explained above. For example, FIG. 12(b) shows how the number of s-linked nodes varies per outer-iteration for the "penguin" example, with a similar behavior being observed for the other examples as well. As can be seen, this number decreases over time. In fact, as implied by condition (8), no s-linked nodes will exist upon an algorithm's termination.

Figure 14A:
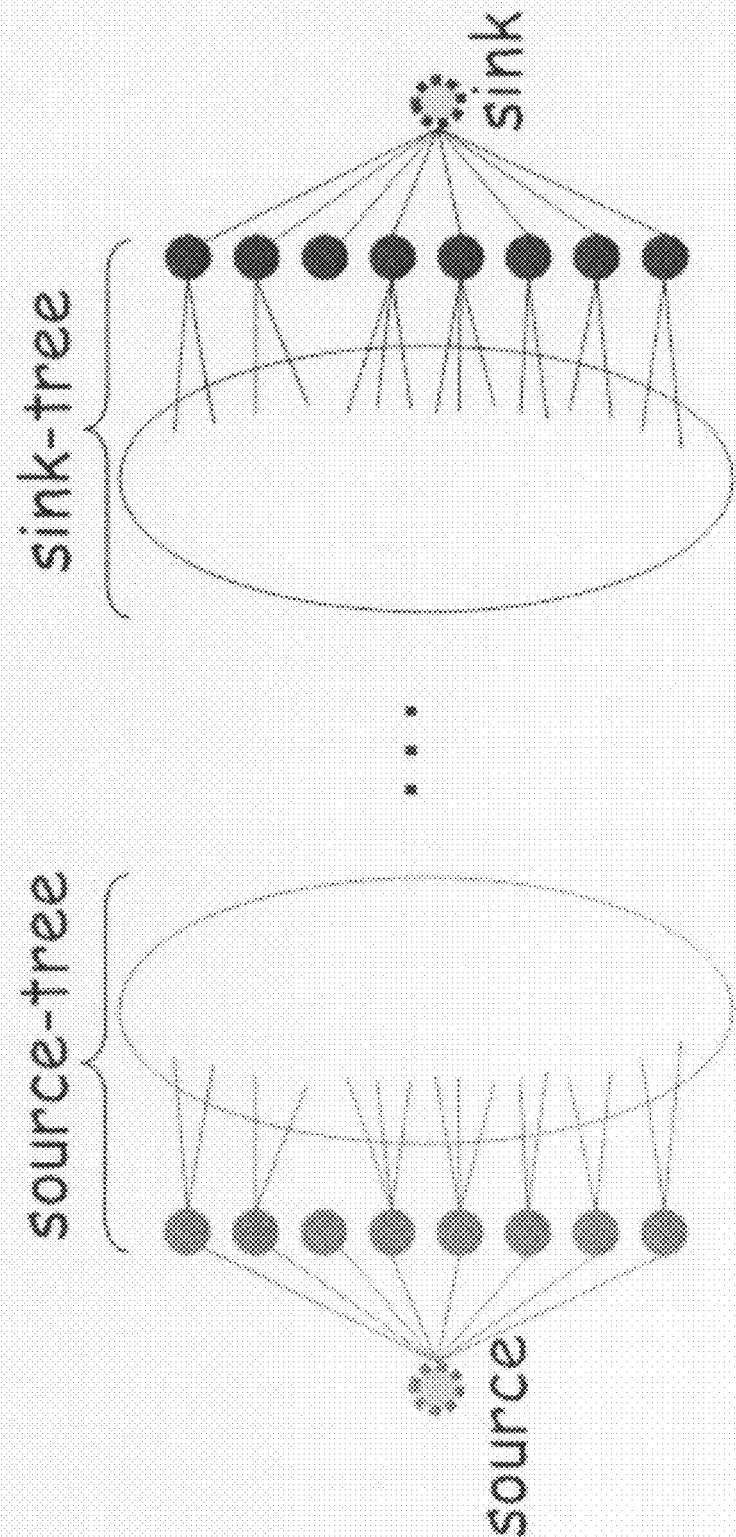
FIGS. 14(a)-(b) illustrate how an augmentation based max-flow algorithm exploits the decrease of s-linked nodes, according to an embodiment of the invention.
Figure 14B:
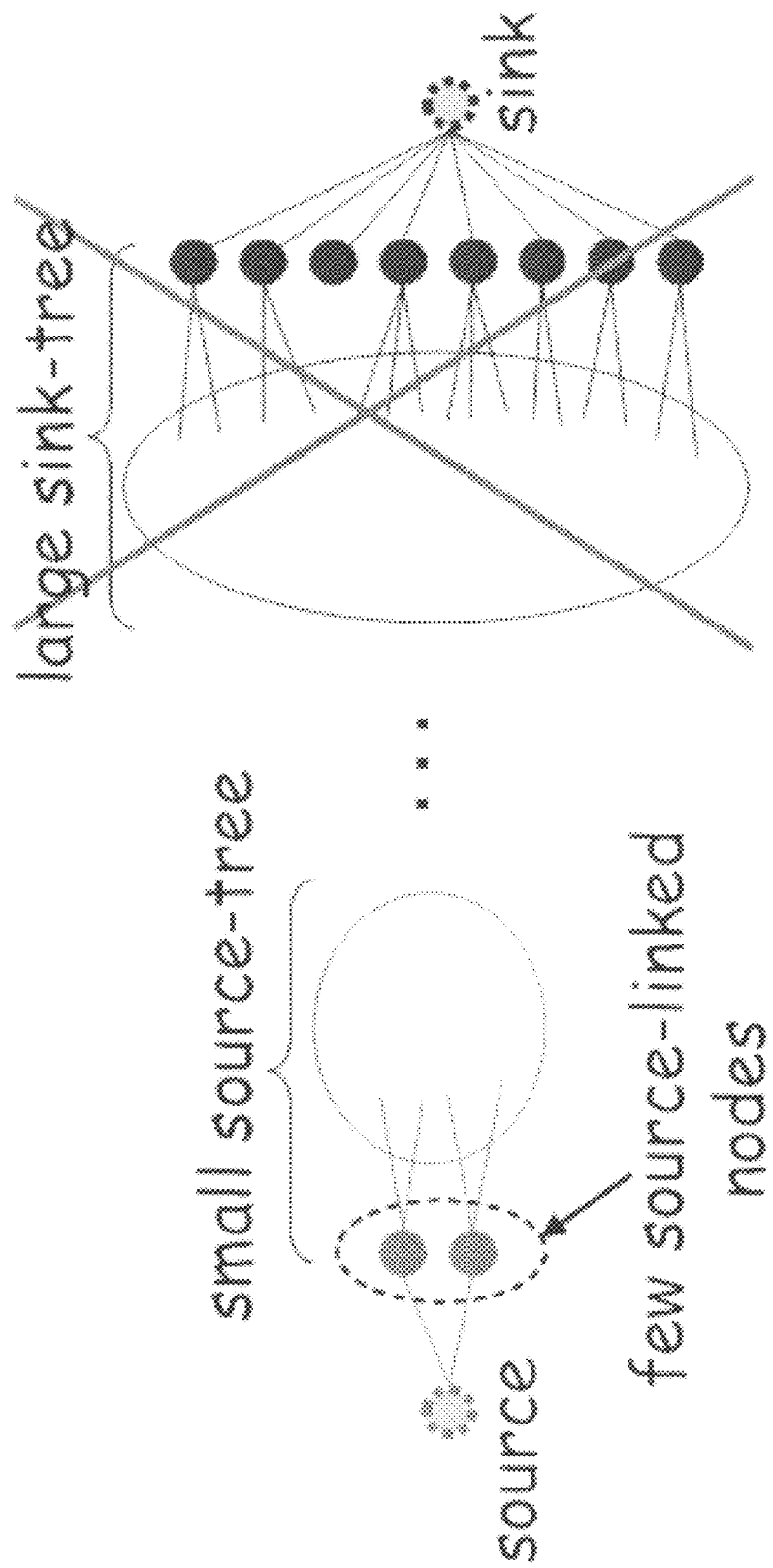

FIGS. 14(a)-(b) illustrate how an augmentation based max-flow algorithm exploits the decrease of s-linked nodes. Referring to FIG. 14(a), a path augmenting max-flow algorithm maintains and expands 2 trees, a source tree and a sink tree, to find new augmenting paths. Here, the source tree will start growing by exploring non-saturated edges that are adjacent to s-linked nodes, whereas the sink tree will grow by exploring non-saturated edges that connect to the t-linked nodes. Whenever these two trees touch each other, a new augmenting path has been found. The max-flow algorithm will terminate when no unsaturated edges that connect these two trees can be found any more. However, referring now to FIG. 14(b), during the execution of a Fast-PD algorithm according to an embodiment of the invention, the source tree turns out to be of much smaller size than the sink tree. This is due to the fact that, as explained above, there can exist only a small number of s-linked nodes. Hence, maintaining the sink tree will be inefficient in this case and will not take advantage of the above mentioned property. Therefore, according to an embodiment of the invention, only the source tree needs maintaining during max-flow, as this will be a cheaper operation to perform. For example, in many inner iterations, there can be fewer than 10 s-linked nodes, but many thousands of t-linked nodes. Moreover, due to the small size of the source tree, detecting the termination of the max-flow part can now be done faster, without having to fully expand the large sink tree, which is a costly operation, thus giving a speedup. In addition to that, for efficiently building a source tree, one keeps track of all s-linked nodes and does not recompute them each time. This tracking can be done without cost, since an s-linked node can be created only inside the PREEDIT DUALS or the POSTEDIT DUALS routine, and thus can be easily detected. The above strategy boosts the performance of max-flow, especially when a only small number of augmentations were needed.

Incremental Graph Construction

Besides the max-flow adaptation, one may also modify the way the max-flow graph $G^c$ is constructed. According to an embodiment of the invention, instead of constructing this capacitated graph $G^c$ from start each time, the capacities may be set incrementally (recall that the max-flow graph is not static, but changes per iteration). In fact, an algorithm according to an embodiment of the invention provides a principled way of doing this incremental graph construction for the case of general MRFs. What allows this is the fact that a Fast-PD algorithm according to an embodiment of the invention maintains both primal and dual information throughout its execution. The following lemma is useful in this regard.

LEMMA 1. Let $G^c$, $\overline{G}^c$ be the graphs for a current and a previous c-iteration. Let also p, q be two neighboring MRF nodes. If, during the interval from the previous to the current c-iteration, no change of label took place for p and q, then the capacities of the interior edges pq, qp in $G^c$ and of the exterior edges sp, pt, sq, qt in $G^c$ equal the residual capacities of the corresponding edges in $\overline{G}^c$.

The proof follows from the fact that if no change of label took place for p, q, then none of the height variables $h_p(x_p)$, $h_q(x_q)$ or the balance variables $y_{pq}(x_p)$, $y_{qp}(x_q)$ could have changed. Due to the above lemma, for building graph $G^c$, one can reuse the residual graph of $\overline{G}^c$ and only recompute those capacities of $G^c$ for which the above lemma does not hold. This way, an additional speedup can be obtained in some cases.

Combining Speed with Optimality

FIG. 13(d) shows the running times of Fast-PD for various MRF examples. As can be seen from that figure, Fast-PD is faster than either the α-expansion or the $PD3_a$ method. For example, a Fast-PD according to an embodiment of the invention has been more than 9 times faster than an α-expansion for the case of the "penguin" image (17.44 secs. vs. 173.1 secs). This behavior is typical, since a Fast-PD algorithm according to an embodiment of the invention has consistently provided at least a 3-9 times speedup for all the examples it has been tested on.

However, besides its efficiency, Fast-PD does not compromise the optimality of its solutions. On the one hand, this is ensured by Theorems 4 and 5, which essentially provide worst-case, theoretical, suboptimality bounds. On the other hand, a Fast-PD algorithm according to an embodiment of the invention, like any other primal-dual method, can also tell for free how well it performed for each particular example on which it has been tested by providing per-instance suboptimality bounds, which, in practice, are tighter than their theoretical counterparts.

Figure 15:
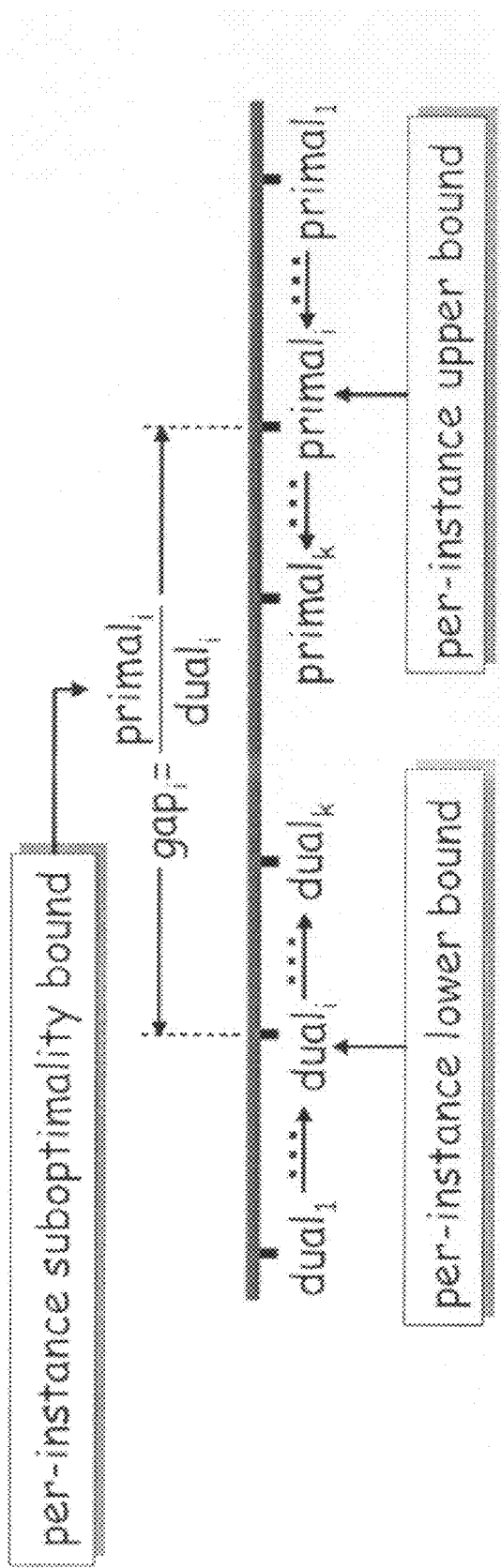
FIG. 15 illustrates how the cost of a dual solution generated during the course of the algorithm forms a per-instance bound on the optimal MRF energy, according to an embodiment of the invention.
Figure 16:
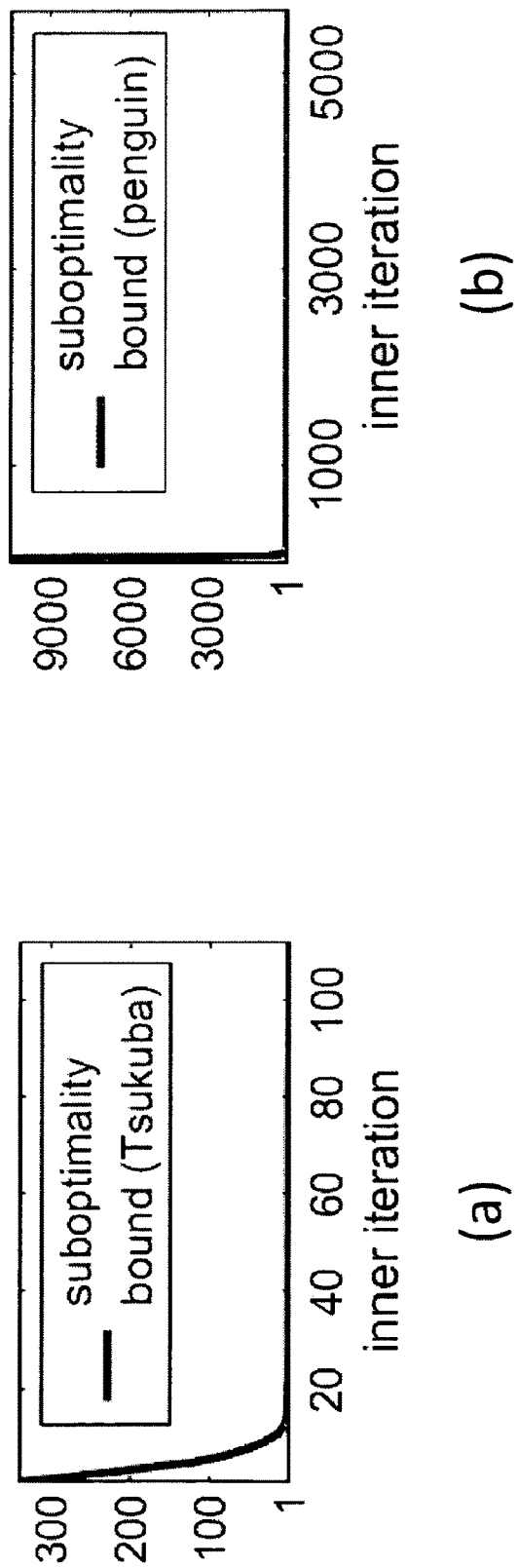
FIGS. 16(a)-(b) shows how ratios vary per inner-iteration for the "Tsukuba" and "penguin" examples, according to an embodiment of the invention.
Figure 17:
FIG. 17 displays the resulting disparity for the "Tsukuba" image pair when a Potts function has been used as the distance function, according to an embodiment of the invention.

FIG. 15 illustrates how the cost of a dual solution generated during the course of the algorithm forms a per-instance bound on the optimal MRF energy. Referring to the figure, to understand how this can be done, let $\{primal_i\}_{i=1}^k$, $\{dual_i\}_{i=1}^k$, be the sequence of primal and dual costs generated during the course of the algorithm. As explained above, any of the dual costs $dual_i$ forms a per-instance lower bound on the optimal MRF energy, say, primal*. Furthermore, any of the primal costs $primal_i$ is obviously a per-instance upper bound on this minimum energy primal*. As a result, any primal-dual ratio $gap_i = primal_i/dual_i$ forms a per-instance suboptimality bound telling at most how far the current energy can be from the unknown optimal energy primal*. This suboptimality bound is updated and becomes tighter as the algorithm progresses. FIGS. 16(a)-(b) shows how the suboptimality bounds vary per inner-iteration for stereo matching in the "tsukuba" image, FIG. 16(a), and for image restoration in the "penguin" image, FIG. 16(b), with similar results holding for the other examples as well. As one can notice, these ratios drop very close to 1, meaning that an almost optimal solution is estimated at the end of the algorithm, despite having an NP time complexity. Before proceeding, note also that no special tuning of either the singleton or the pairwise potential functions took place for deriving the results in FIGS. 10(a)-(f). Therefore, by properly adjusting these functions with more care, even better results may be obtained by a Fast-PD algorithm according to an embodiment of the invention. FIG. 17 displays the resulting disparity for the "Tsukuba" image pair when a Potts function, instead of a truncated linear function, has been used as the distance function d(,).

A Fast-PD algorithm according to an embodiment of the invention has also been applied to the example of inter- or intra-modal deformable registration, which is one of the most challenging examples in medical imaging. To satisfying smoothness of the deformation field and reducing the dimensionality of the example, the deformation is represented by free form deformations. A method according to an embodiment of the invention reformulates registration as an MRF optimization program, where a set of labels is associated with a set of deformations, and one seeks to attribute a label to each control point such that once the corresponding deformation has been applied, the similarity metric between the source and the target is maximal for all voxels. To demonstrate the performance of a deformable registration framework using a FastPD according to an embodiment of the invention, a FastPD was run against a non-rigid image registration method based on B-Spline Free Form Deformation (FFD) together with a gradient descent optimization, on the same data with similar registration parameters in terms of equal FFD mesh size and same dissimilarity measure.

Figure 18:
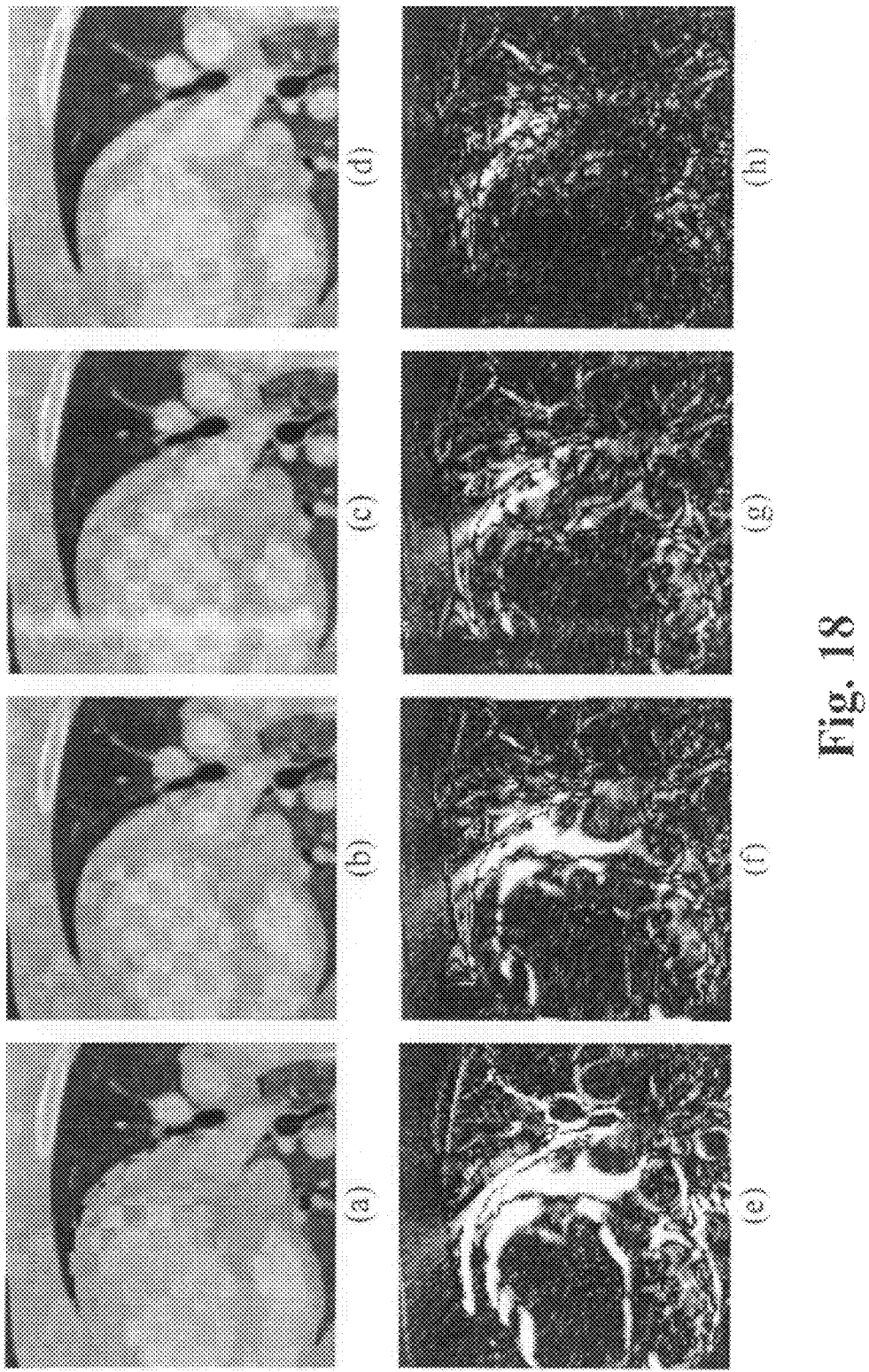
FIGS. 18(a)-(h) show registration results using two CT volumes of a pig heart, according to an embodiment of the invention.

FIGS. 18(a)-(h) show the results using two CT volumes of a pig heart. FIG. 18(a) shows a checkerboard visualization before registration, FIG. 18(b) shows the visualization after registration using a prior art method, and FIG. 18(c) shows the visualization after registration using a method according to an embodiment of the invention, and FIG. 18(d) shows the visualization after registration using pyramidal settings. The same order applies to FIGS. 18(e)-(h) for difference images. The volume resolution is 128×128×88. Due to the heart beat a deformation of the shape before registration is visible. While the gradient-descent approach takes more than two hours to converge, the running time of a method according to an embodiment of the invention is less than 2 minutes using an AMD Athlon64 at 2.21 GHz. Also, visually the results of the registration are slightly better. Within a region of interest enclosing the heart an average SSD error of 12278 before registration is measured. The gradient-descent method achieves an error of 3402, while a method according to an embodiment of the invention minimizes the error to 3180. Note that this experiment was not performed to obtain the best registration of the two data sets, but rather to compare the two algorithms. With a standard pyramidal approach a SSD error of 1233 was obtained with a same running time of about 2 minutes.

Dynamic MRFs

A Fast-PD algorithm according to an embodiment of the invention can also be adapted to also boost the efficiency for dynamic MRFs, that is, MRFs varying over time. An implicit assumption here is that the change between successive MRFs is small, and so, by initializing the current MRF with the final (primal) solution of the previous MRF, one expects improved performance. However, a FastPD can exploit not only the previous MRF's primal solution (say $\bar{x}$), but also its dual solution (say $\bar{y}$).

For initializing x, one can set $x=\bar{x}$. The initialization of y, however, is more involved. For maintaining the optimality properties of a Fast-PD algorithm according to an embodiment of the invention, it turns out that, after setting $y=\bar{y}$, a slight correction still needs to be applied to y. In particular, a Fast-PD according to an embodiment of the invention requires its initial solution y to satisfy condition (8): $y_{pq}(x_p)+y_{qp}(x_q)=w_{pq}d(x_p, x_q)$, whereas $\bar{y}$ satisfies $\bar{y}_{pq}(x_p)+\bar{y}_{qp}(x_q)=\bar{w}_{pq}\bar{d}(x_p,x_q)$, i.e. condition (8) with $w_{pq}d(,)$ replaced by the pairwise potential $\bar{w}_{pq}\bar{d}(,)$ of the previous MRF. The solution for fixing that is to set $y_{pq}(x_p)+=w_{pq}d(x_p, x_q)-\bar{w}_{pq}\bar{d}(x_p, x_q)$. Finally, for taking into account a possibly different singleton potentials between successive MRFs, the new heights should be updated as $h_p(\ )+=c_p(\ )-\bar{c}_p(\ )$, where $\bar{c}_p(\ )$ are the singleton potentials of the previous MRF. These are the only changes needed for the case of dynamic MRFs, and FIG. 20 shows the new pseudocode for the routine INIT DUALS PRIMALS.

Figure 19A:
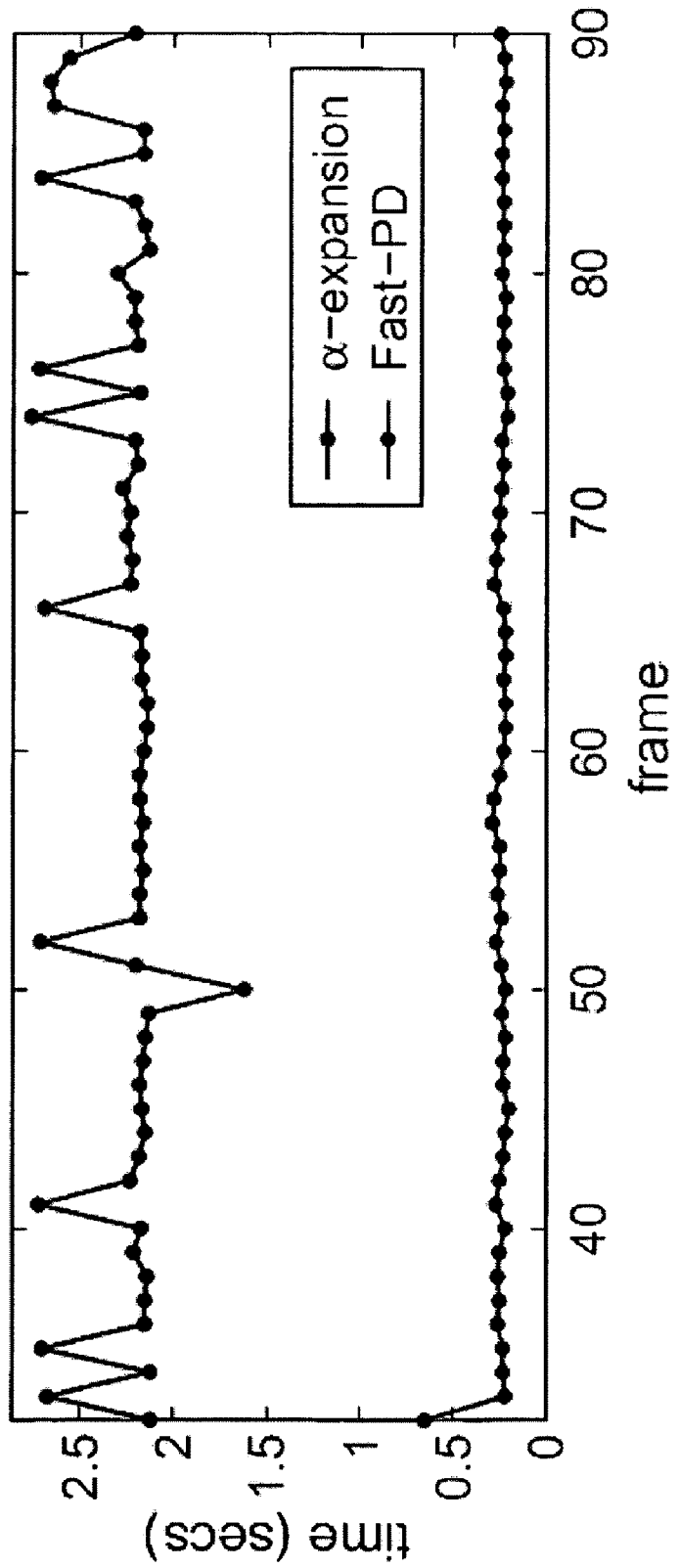
FIGS. 19(a)-(b) compares the running times and number of augmenting paths per frame for the "SRI tree" image sequence for a Fast-PD and an α-expansion, according to an embodiment of the invention.
Figure 19B:
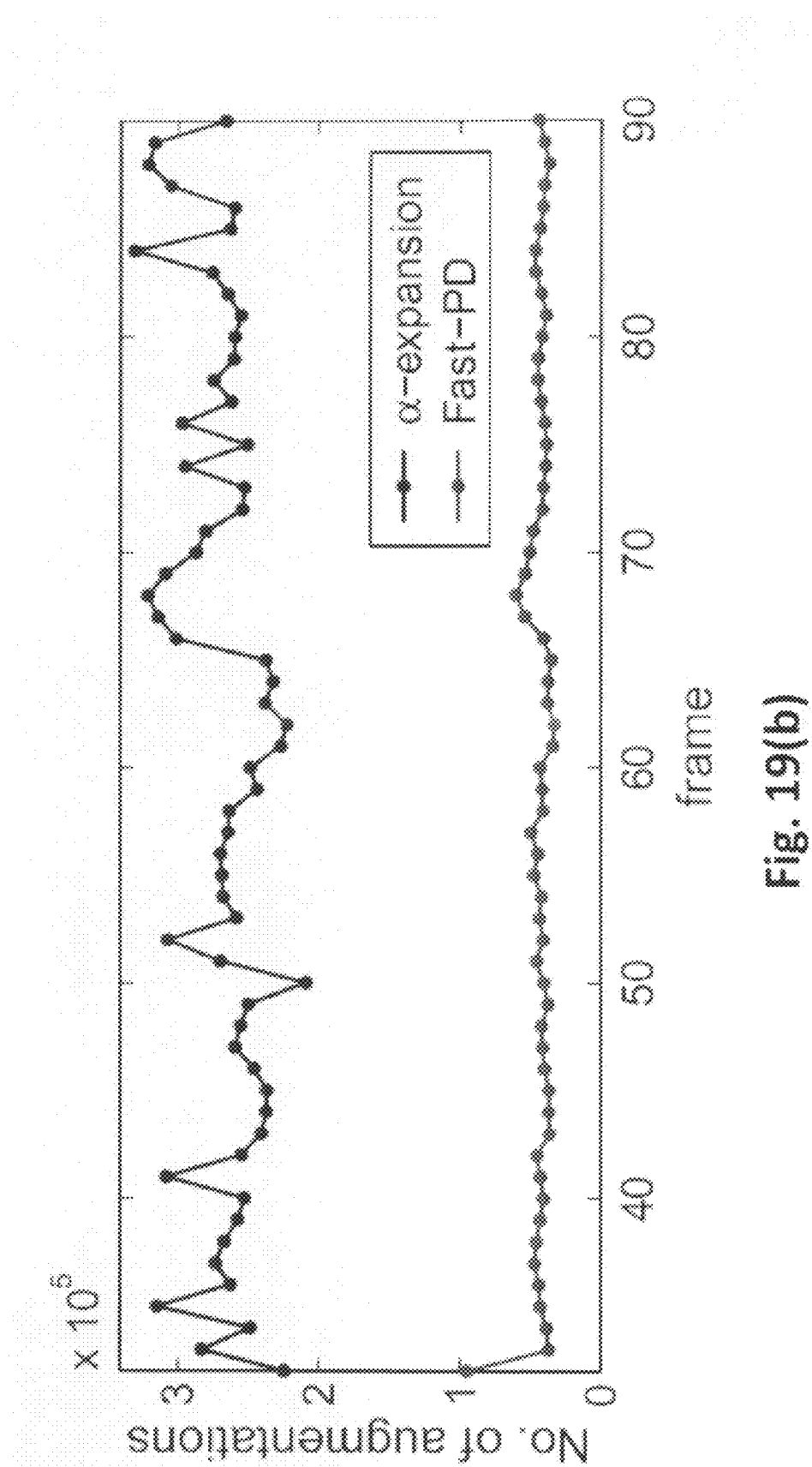

As expected, the speedup provided by a Fast-PD according to an embodiment of the invention for dynamic MRFs is greater than for a single MRF. FIG. 19(a) compares the running times per frame for the "SRI tree" image sequence for a Fast-PD according to an embodiment of the invention and an α-expansion. A Fast-PD according to an embodiment of the invention proves to be more than 10 times faster than an α-expansion in this case, requiring on average 0.22 secs. per frame, whereas an α-expansion required 2.28 secs. on average. A Fast-PD according to an embodiment of the invention can thus run about 5 frames/sec., thus can do stereo matching in almost real time for this example. In fact, if successive MRFs are similar, even much bigger speedups can be achieved. FIG. 19(b) shows the corresponding number of augmenting paths per frame for the "SRI tree" image sequence, for both an α-expansion and a Fast-PD according to an embodiment of the invention. As can be seen from that figure, a reduction in the number of augmenting paths is achieved by a Fast-PD according to an embodiment of the invention, which helps that algorithm to reduce its running time.

This same behavior has been observed in all other dynamic examples on which a Fast-PD according to an embodiment of the invention has been tested as well. FIG. 21(a) illustrates how a primal-dual algorithm reduces costs for dynamic MRFs. For this example, a Fast-PD according to an embodiment of the invention has closed the gap between the costs primal$_{\bar{x}}$, dual$_{\bar{y}}$, of the final primal-dual solutions $\bar{x}$, $\bar{y}$ of a previous MRF. However, due to the possibly different singleton $c_p(\ )$ or pairwise $w_{pq}d(,)$ potentials of the current MRF, these costs need to be perturbed to generate the costs primal$_x$, dual$_y$ for the initial solutions x, y of the current MRF. Nevertheless, as only slight perturbations take place, the new primal-dual gap between primal$_x$, dual$_y$ will still be close to the previous gap between primal$_{\bar{x}}$, dual$_{\bar{y}}$. This means that the new initial gap will be small and, so, few augmenting paths will have to be found even from the first iteration of the current MRF, which helps to improve the efficiency for doing inference on that MRF.

Figure 21B:
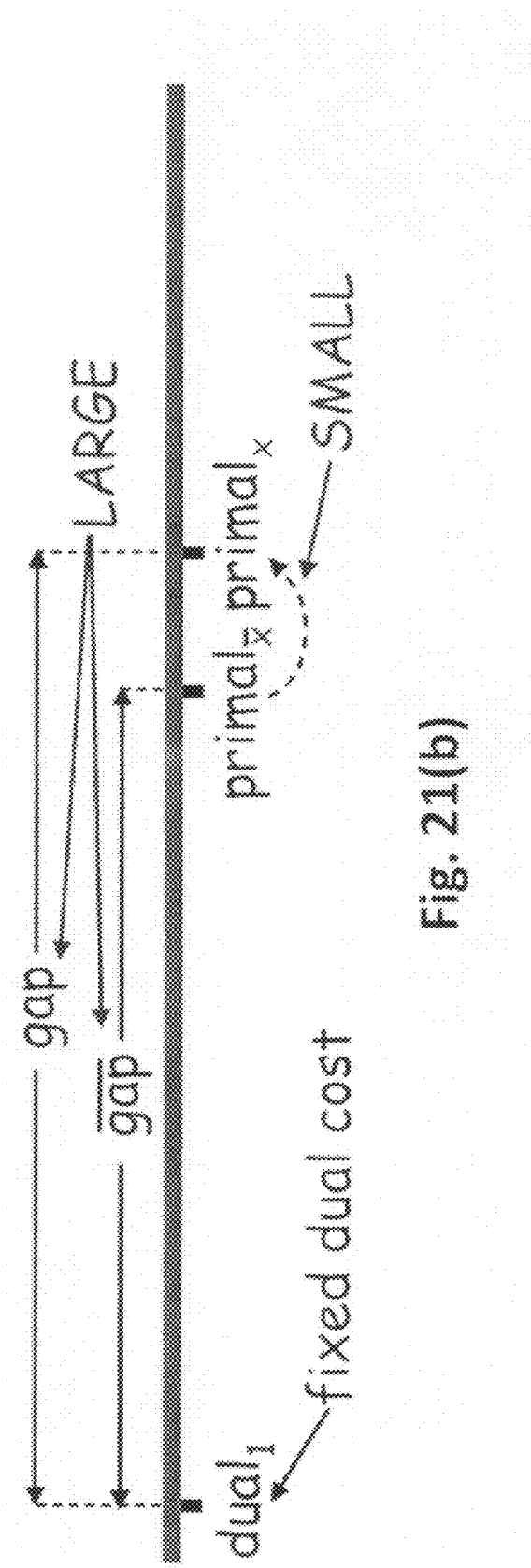

FIG. 21(b) illustrates the case of an algorithm that works only in the primal domain, such as the α-expansion. Here, the final primal-dual gap for the previous MRF will be large. Hence, despite that only a small perturbation takes place between the costs of the previous and the current primal solution primal$_{\bar{x}}$ and primal$_x$, the initial primal-dual gap for the current MRF will necessarily be large, which means that many augmenting paths will be computed right from the first iteration of the current MRF, thus slowing inference.

Figure 22:
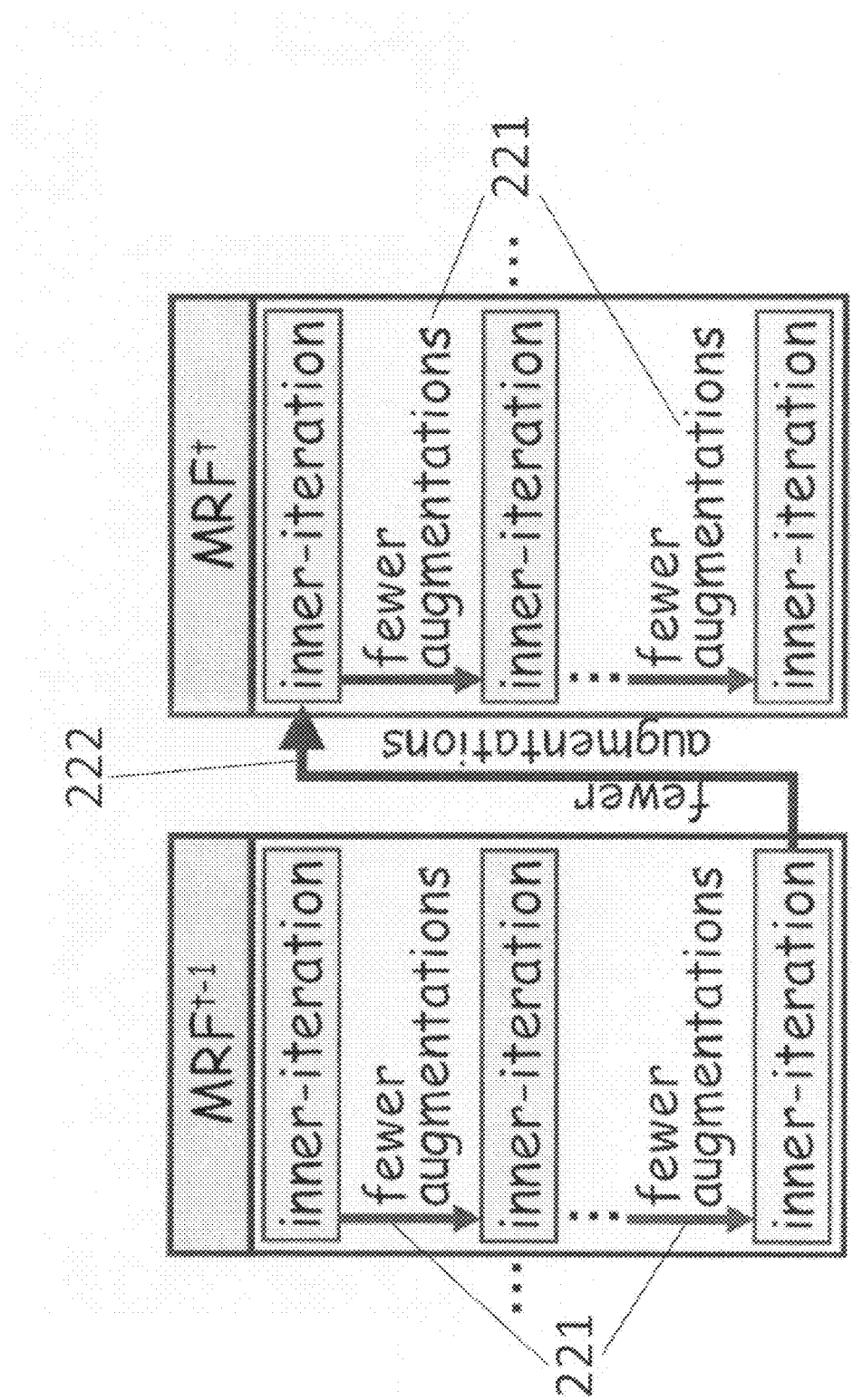
FIG. 22 illustrates how, for the case of dynamic MRFs, a Fast-PD according to an embodiment of the invention can boost performance by reducing the number of augmenting paths in two ways, according to an embodiment of the invention.

FIG. 22 illustrates how, for the case of dynamic MRFs, a Fast-PD according to an embodiment of the invention can boost performance by reducing the number of augmenting paths in two ways. The first concerns the different inner iterations of the same MRF, illustrated by the arrows 221, whereas the second extends across time, that is, across different MRFs, illustrated by the arrow 222 connecting a last iteration of MRF$^{t-1}$ to first iteration of MRF$^t$.

Proof of Theorem 4

This section presents the proof for Theorem 4, which certifies that the solutions estimated by the Fast-PD algorithm have guaranteed optimality properties. First, the following 3 lemmas are needed.

LEMMA A.1: During a c-iteration, the following inequalities hold true exactly after UPDATE DUALS PRIMALS:

$$y'_{pq}(c) \leq y_{pq}(c) + \text{cap}_{pq}, \quad (19)$$

$$y'_{qp}(c) \leq y_{qp}(c) + \text{cap}_{qp}. \quad (20)$$

PROOF. An intuitive proof comes from the fact that flows $f_{pq}$ and $f_{qp}$ represent the increase of the balance variables $y_{pq}(c)$ and $y_{qp}(c)$ respectively during UPDATE DUALS PRIMALS. Since it is always true that:

$$f_{pq} \leq \text{cap}_{pq},$$

$$f_{qp} \leq \text{cap}_{qp},$$

the lemma then follows directly.

LEMMA A.2: During a c-iteration, the following entailments hold true:

$$\text{load}_{pq}(c,\bar{x}_q) \leq w_{pq}d(c,\bar{x}_q) \Rightarrow \text{load}'_{pq}(c,\bar{x}_q) \leq w_{pq}d(c,\bar{x}_q), \quad (21)$$

$$\text{load}_{pq}(\bar{x}_p,c) \leq w_{pq}d(\bar{x}_p,c) \Rightarrow \text{load}'_{pq}(\bar{x}_p,c) \leq w_{pq}d(\bar{x}_p,c), \quad (22)$$

where $\bar{x}$ can be any labeling which is a c-expansion of the primal solution x at the start of the current c-iteration. In the above entailments, quantities $\text{load}_{pq}(c, \bar{x}_q)$, $\text{load}_{pq}(\bar{x}_p, c)$ are assumed to estimated using the value of the balance variables exactly after PREEDIT DUALS.

PROOF. If $\bar{x}_q=c$ then EQ. (21) is trivial to prove. It may be assumed that $\bar{x}_q=x_q \neq c$, since $\bar{x}$ is a c-expansion of x. So, to prove EQ. (21), assume that:

$$\text{load}_{pq}(c, x_q) \leq w_{pq}d(c, x_q).$$

But then, by combining LEMMA A.1 with the definition of capacity cap$_{pq}$ in EQ. (14), one obtains:

$$y'_{pq}(c) \leq y_{pq}(c) + \text{cap}_{pq} = y_{pq}(c) + [w_{pq}d(c, x_q) - \text{load}_{pq}(c, x_q)]^+$$
$$= y_{pq}(c) + w_{pq}d(c, x_q) - \text{load}_{pq}(c, x_q)$$
$$= w_{pq}d(c, x_q) - y_{qp}(x_q)$$
$$= w_{pq}d(c, x_q) - y'_{qp}(x_q),$$

which thus proves EQ. (21). The proof for EQ. (22) proceeds similarly.

LEMMA A.3: At the last c-iteration of a Fast-PD algorithm according to an embodiment of the invention, the following inequalities hold for any p, q:

$$\text{load}'_{pq}(c, x'_q) \leq w_{pq} d_{max},$$

$$\text{load}'_{pq}(x'_p, c) \leq w_{pq} d_{max}.$$

PROOF. The lemma is trivial if either $c=x'_p$ or $c=x'_q$ and so it will hereafter be assumed that $c \neq x'_p$ and $c \neq x'_q$. Furthermore, since this is the last c-iteration, no label change takes place, and so:

$$x'_p = x_p, \ x'_q = x_q.$$

CASE 1: If the following two inequalities hold true:

$$\text{load}_{pq}(c, x_q) \leq w_{pq} d(c, x_q), \qquad (23)$$

$$\text{load}_{pq}(x_p, c) \leq w_{pq} d(x_p, c), \qquad (24)$$

then the lemma follows directly from Lemma A.2.

CASE 2: It thus remains to consider the case where at least one of the inequalities (23), (24) is violated. Then (and only then), PREEDIT DUALS (by definition) will adjust $y_{pq}(c)$ so that:

$$\text{load}_{pq}(c, x_q) = w_{pq} d(c, x_q). \qquad (25)$$

Hence, condition (23) will be restored after the adjustment. It may be assumed that condition (24) will remain violated after the adjustment, or else one would fall back to Case 1, i.e. it may be assumed that:

$$\text{load}_{pq}(x_p, c) > w_{pq} d(x_p, c). \qquad (26)$$

Based on inequalities (25), (26) and the definition of capacities in (14), (15), it then results that $\text{cap}_{pq} = \text{cap}_{qp} = 0$. This implies that $y'_{pq}(c) = y_{pq}(c)$, and it can then be shown that:

$$\text{load}'_{pq}(c, x_q) = \text{load}_{pq}(c, x_q),$$

$$\text{load}'_{pq}(x_p, c) = \text{load}_{pq}(x_p, c).$$

But then:

$$\text{load}'_{pq}(c, x_q) = \text{load}_{pq}(c, x_q) = w_{pq} d(c, x_q) \leq w_{pq} d_{max};$$

and also:

$$\begin{aligned}
\text{load}'_{pq}(x_p, c) &= \text{load}_{pq}(x_p, c) \qquad (27)\\
&= [\text{load}_{pq}(x_p, c) + \text{load}_{pq}(c, x_q)] - \text{load}_{pq}(c, x_q)\\
&= \text{load}_{pq}(x_p, x_q) - \text{load}_{pq}(c, x_q)\\
&= w_{pq} d(x_p, x_q) - w_{pq} d(c, x_q) \leq w_{pq} d_{max},
\end{aligned}$$

with equality (27) being true due to the identity $$\text{load}_{pq}(x_p, c) + \text{load}_{pq}(c, x_q) = \text{load}_{pq}(x_p, x_q).$$

The proof of Theorem 4 follows.

PROOF FOR THEOREM 4: To complete the proof of this theorem, it needs to shown that each one of the complementary slackness conditions (8)-(10) will hold true by the time Fast-PD terminates:

Condition (9): As already explained above, the UPDATE DUALS PRIMALS routine can restore condition (9) for most pairs (p; q) during any inner-iteration. However, even if there do exist pairs that violate this condition after UPDATE DUALS PRIMALS, then the POSTEDIT DUALS routine can, by definition, always restore condition (9) for them.

Condition (10): Based on LEMMA A.3, it follows that, given any label a, the following inequality will hold true after the last α-iteration:

$$\text{load}_{pq}(a, x_q) \leq w_{pq} d_{max}.$$

Similarly, given any label b, the following inequality will also hold true after the last b-iteration:

$$\text{load}_{pq}(x_p, b) \leq w_{pq} d_{max}.$$

Combining these inequalities with the identity:

$$\text{load}_{pq}(a, b) + \text{load}_{pq}(x_p, x_q) = \text{load}_{pq}(a, x_q) + \text{load}_{pq}(x_p, b),$$

one obtains:

$$\begin{aligned}
\text{load}_{pq}(a, b) &= [\text{load}_{pq}(a, b) + \text{load}_{pq}(x_p, x_q)] - \text{load}_{pq}(x_p, x_q)\\
&= [\text{load}_{pq}(a, x_q) + \text{load}_{pq}(x_p, b)] - \text{load}_{pq}(x_p, x_q)\\
&\leq 2 w_{pq} d_{max} - \text{load}_{pq}(x_p, x_q),
\end{aligned}$$

and then condition (10) follows trivially, since $\text{load}_{pq}(x_p, x_q) = d(x_p, x_q) \geq 0$ by EQ. (9).

Condition (8): It turns out that the UPDATE DUALS PRIMALS routine can finally ensure condition (8) due to the way that the exterior capacities of graph $G^c$ are defined. Since Fast-PD uses the same definition as PD3$_a$ for these capacities, the corresponding proof applies here as well.

Proof of Theorem 5:

This section presents the proof for Theorem 5, which shows that when distance d(,) is a metric, then Fast-PD can compute exactly the same solution as the α-expansion algorithm. To this end, the following two lemmas will be used.

LEMMA B.1: Define $$\text{primal}(x) \equiv \text{MRF energy of labeling } x,$$

and let also x be any primal solution generated during an inner-iteration of the Fast-PD algorithm. It then holds that:

$$\text{primal}(x) = \sum_p h_p(c_p)$$

PROOF.

$$\begin{aligned}
\text{primal}(x) &= \sum_p c_p(x_p) + \sum_{pq \in E} w_{pq} d(x_p, x_q)\\
&= \sum_p c_p(x_p) + \sum_{pq \in E} \text{load}(x_p, x_q)\\
&= \sum_p c_p(x_p) + \sum_{pq \in E} (y_{pq}(x_p) + y_{qp}(x_q))\\
&= \sum_p c_p(x_p) + \sum_p \sum_{q:\, pq \in E} y_{pq}(x_p)\\
&= \sum_p \left( c_p(x_p) + \sum_{q:\, pq \in E} y_{pq}(x_p) \right)\\
&= \sum_p h_p(x_p).
\end{aligned}$$

LEMMA B.2: Let the distance function d(,) be a metric. Let x be the primal solution at the start of the current c-iteration, and let also $\bar{x}$ be any solution which coincides with a c-expansion of solution x. It will then hold that:

$$\text{load}'_{pq}(\bar{x}_q, \bar{x}_p) \leq w_{pq} d(\bar{x}_p, \bar{x}_q).$$

PROOF. If either $\bar{x}_p = \bar{x}_q = c$ or $\bar{x}_p = x_p$, $\bar{x}_q = x_q$, the lemma is trivial to prove. So assume that $\bar{x}_p = x_p$, $\bar{x}_q = c$ (the case $\bar{x}_p = c$, $\bar{x}_q = x_q$ can be handled similarly). In this case, it needs to be shown that:

$$\text{load}'_{pq}(x_p, c) \leq w_{pq}d(x_p, c).$$

Due to EQ. (32) in LEMMA A.2, it then suffices to show that the following condition will hold true after PREEDIT DUALS:

$$\text{load}_{pq}(x_p, c) \leq w_{pq}d(x_p, c). \quad (28)$$

Regarding inequality (28), this will always hold if PREEDIT DUALS has to apply no adjustment to $y_{pq}(c)$ (this results from the definition of PREEDIT DUALS). However, even if PREEDIT DUALS must adjust the value of $y_{pq}(c)$, inequality (28) will still hold true, provided that $d(,)$ is a metric.

To see that, observe that after the adjustment made by PREEDIT DUALS, it will then hold:

$$\text{load}_{pq}(c, x_q) = w_{pq}d(c, x_q),$$

and so:

$$\text{load}_{pq}(x_p, c) = [\text{load}_{pq}(x_p, c) + \text{load}_{pq}(c, x_q)] - \text{load}_{pq}(c, x_q)$$
$$= \text{load}_{pq}(x_p, x_q) - \text{load}_{pq}(c, x_q)$$
$$= w_{pq}d(x_p, x_q) - w_{pq}d(c, x_q) \cdot \leq w_{pq}d(x_p, c),$$

where the last inequality holds due to that $d(,)$ is a metric and thus has to satisfy the triangle inequality.

The proof of Theorem 5 follows.

PROOF FOR THEOREM 5. Let x be the primal solution at the start of the current c-iteration, let x' be the solution selected by a Fast-PD according to an embodiment of the invention at the end of the current c-iteration, and let also $\bar{x}$ be any solution which coincides with a c-expansion of solution x.

To prove the theorem, one needs to show that:

$$\text{primal}(x') \leq \text{primal}(\bar{x})$$

To this end, it suffices to show that the following conditions hold true:

$$\text{primal}(x') = \sum_p h'_p(x'_p), \quad (29)$$

$$\sum_p h'_p(x'_p) \leq \sum_p h'_p(\bar{x}_p), \quad (30)$$

$$\sum_p h'_p(x'_p) \leq \text{primal}(\bar{x}). \quad (31)$$

Regarding EQ. (29), this follows directly by applying LEMMA B.1 to the primal solution x' generated by a Fast-PD algorithm according to an embodiment of the invention. To prove inequality (30), one can first show that $h'_p(x'_p) = \min\{h'_p(x_p); h'_p(c)\}$. In addition to that, it will also hold either $\bar{x}_p = x_p$ or $\bar{x}_p = c$, since $\bar{x}$ is a c-expansion of x. By combining these facts, it then results that $h'_p(x'_p) \leq h'_p(\bar{x}_p)$, and thus inequality (30) follows directly.

Finally, inequality (31) will hold true because:

$$\text{primal}(\bar{x}) = \sum_p c_p(\bar{x}_p) + \sum_{pq \in E} w_{pq}d(\bar{x}_p, \bar{x}_q) \geq \sum_p c_p(\bar{x}_p) +$$
$$\sum_{pq \in E} \text{load}'(\bar{x}_p, \bar{x}_q)$$
$$= \sum_p c_p(\bar{x}_p) + \sum_{pq \in E} (y'_{pq}(\bar{x}_p) + y'_{qp}(\bar{x}_q))$$
$$= \sum_p c_p(\bar{x}_p) + \sum_p \sum_{q: pq \in E} y'_{pq}(\bar{x}_p)$$
$$= \sum_p \left( c_p(\bar{x}_p) + \sum_{q: pq \in E} y'_{pq}(\bar{x}_p) \right)$$
$$= \sum_p h'_p(\bar{x}_p).$$

□

Proof of Theorem 7

THEOREM 7. For a Fast-PD according to an embodiment of the invention, the primal-dual gap at the current inner-iteration forms an approximate upper bound for the number of augmenting paths at each iteration thereafter.

PROOF. The cost of a dual solution is defined as:

$$\text{dual cost} = \sum_p \min_{a \in L} h_p(a),$$

which implies that:

$$\text{dual cost} \leq \sum_p \min(h_p(c), h_p(x_p)). \quad (32)$$

Furthermore, in the case of a Fast-PD algorithm according to an embodiment of the invention, it can be shown that the following equality will hold before the start of max-flow at an inner-iteration (see LEMMA B.1):

$$\text{primal cost} = \sum_p h_p(x_p). \quad (33)$$

Based on EQS. (32), (33), the following inequality then results:

$$\text{primal dual gap} = \text{primal cost} - \text{dual cost} \geq \sum_p h_p(x_p) -$$
$$\sum_p \min(h_p(c), h_p(x_p))$$
$$= \sum_p [h_p(x_p) - h_p(c)]^+$$
$$= \sum_p cap_{sp}.$$

But the quantity $$\sum_p cap_{sp}$$

forms an upper-bound on the maximum flow during a c-iteration, which, in turn, forms an upper-bound of the number of augmenting paths, assuming integral flows. In addition to that, the upper bound defined by $$\sum_p cap_{sp}$$

will not increase during any of the next c-iterations, which means that the number of augmentations will keep decreasing over time, and so the current primal-dual gap will be an approximate upper bound for the number of augmentations of the next c-iterations as well.

The fact that the upper bound $$\sum_p cap_{sp} = \sum_p [h_p(x_p) - h_p(c)]^+$$

will not increase during any of the next iterations may be justified by the fact that any of the terms $[h_p(x_p)-h_p(c)]^+$ can increase only during either PREEDIT DUALS or POSTEDIT DUALS. It is easy to show that UPDATE DUALS PRIMALS may only decrease the value of these terms. However, both PREEDIT DUALS and POSTEDIT DUALS modify the height variables $h_p(\ )$ only in rare occasions during the execution of a Fast-PD according to an embodiment of the invention. For example, if d(,) is a metric, one may prove that none of the height variables need to be altered by POSTEDIT DUALS. Hence, the terms $[h_p(x_p)-h_p(c)]^+$ will typically not be altered by these routines, or at most by a negligible amount, and so only UPDATE DUALS PRIMALS may modify these terms, thus decreasing their values.

Max-Flow Algorithm

Figure 23:
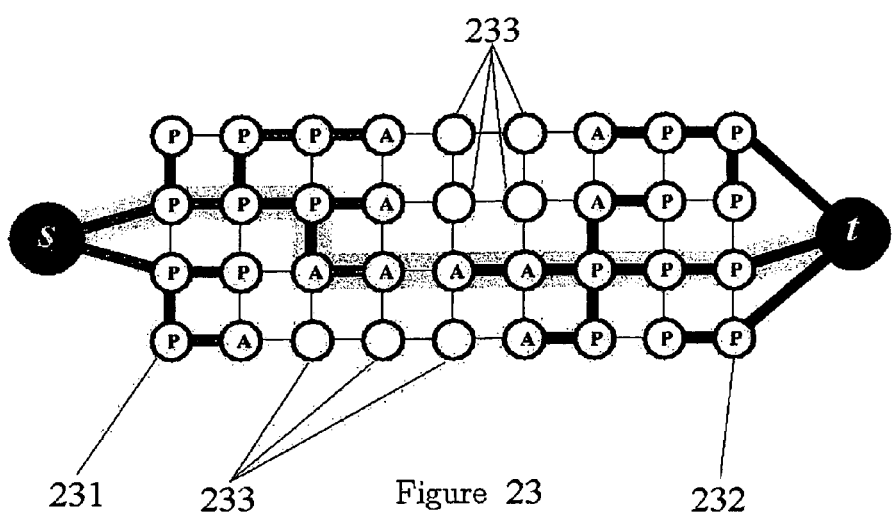
FIG. 23 depicts exemplary search tree use for a min-cut/max-flow algorithm, according to an embodiment of the invention.

An improved new min-cut/max-flow algorithm is disclosed in Y. Boykov and V. Kolmogorov, "An experimental comparison of min-cut/max-flow algorithms for energy minimization in vision", *IEEE Transactions on Pattern Analysis and Machine Intelligence (PAMI)*, 26(9), 2004, the contents of which are herein incorporated by reference in their entirety. This algorithm builds two search trees, one from the source and the other from the sink. However, this algorithm reuses these trees and never start building them from scratch. A drawback is that the augmenting paths found are not necessarily shortest augmenting path. Two non-overlapping search trees S and T with roots at the source s and the sink t, correspondingly, are maintained. FIG. 23 depicts exemplary search trees used for this min-cut/max-flow algorithm. The figure shows search tree S 231 rooted at the source node s and search tree T 232 rooted at the sink node t, with active nodes labeled "A", passive nodes labeled "P", and unlabeled free nodes 233. In tree S all edges from each parent node to its children are non-saturated, while in tree T edges from children to their parents are non-saturated. The nodes that are not in S or T are called "free". The following relationships hold:
S ⊂ V, s∈S, T ⊂ V, t∈T, S∩T=.

The nodes in the search trees S and T can be either "active" or "passive". The active nodes represent the outer border in each tree while the passive nodes are internal. The active nodes allow trees to "grow" by acquiring new children (along non-saturated edges) from a set of free nodes. The passive nodes can not grow as they are completely blocked by other nodes from the same tree. Active nodes may also come in contact with the nodes from the other tree. An augmenting path is found as soon as an active node in one of the trees detects a neighboring node that belongs to the other tree.

The algorithm iteratively repeats the following three stages:
  "growth" stage: search trees S and T grow until they touch giving an s→t path;
  "augmentation" stage: the found path is augmented, the search tree(s) break into forest(s);
  "adoption" stage: trees S and T are restored.

At the growth stage the search trees expand. The active nodes explore adjacent non-saturated edges and acquire new children from a set of free nodes. The newly acquired nodes become active members of the corresponding search trees. As soon as all neighbors of a given active node are explored the active node becomes passive. The growth stage terminates if an active node encounters a neighboring node that belongs to the opposite tree. In this case a path was detected from the source to the sink, as shown in FIG. 23.

The augmentation stage augments the path found at the growth stage. Since the largest flow possible was pushed through the graph, some edge(s) in the path become saturated. Thus, some of the nodes in the trees S and T may become "orphans", that is, the edges linking them to their parents are no longer valid (they are saturated). In fact, the augmentation phase may split the search trees S and T into forests. The source s and the sink t are still roots of two of the trees while orphans form roots of all other trees.

The adoption stage restores the single-tree structure of sets S and T with roots in the source and the sink. This stage tries to find a new valid parent for each orphan. A new parent should belong to the same set, S or T, as the orphan. A parent should also be connected through a non-saturated edge. If there is no qualifying parent the orphan is removed from S or T and made a free node. All of its former children are declared as orphans. The stage terminates when no orphans are left and, thus, the search tree structures of S and T are restored. Since some orphan nodes in S and T may become free the adoption stage results in contraction of these sets.

After the adoption stage is completed the algorithm returns to the growth stage. The algorithm terminates when the search trees S and T cannot grow (no active nodes) and the trees are separated by saturated edges. This implies that a maximum flow is achieved. The corresponding minimum cut can be determined by S=S and T=T.

Implementation Details

Assume that there is a directed graph G=(V, E), and that a flow f and the residual graph $G_f$ are maintained. Lists of all active nodes, A, and all orphans, O are also maintained. The general structure is:

```
initialize: S = {s}, T = {t}, A = {s, t}, O = ∅;
while true
   grow S or T to find an augmenting path P from s to t
   if P = ∅; terminate
   augment on P
   adopt orphans
end while
```

The details of the growth, augmentation, and adoption stages are described below. It is convenient to store content of search trees S and T via flags TREE(p) indicating affiliation of each node p so that $$TREE(p) = \begin{cases} S & \text{if } p \in S, \\ T & \text{if } p \in T, \\ \emptyset & \text{if } p \text{ is free}. \end{cases}$$

If node p belongs to one of the search trees then the information about its parent will be stored as PARENT(p). Roots of the search trees (the source and the sink), orphans, and all free nodes have no parents, i.e. PARENT(p)=. The notation tree_cap(p→q) will be used to describe residual capacity of either edge (p, q) if TREE(p)=S or edge (q, p) if TREE(p)=T. These edges should be non-saturated in order for node p to be a valid parent of its child q depending on the search tree.

Growth stage: At this stage active nodes acquire new children from a set of free nodes.

```
while A≠∅
    pick an active node p∈A
    for every neighbor q such that tree_cap(p→q)>0
        if TREE(q)=∅ then
            // add q to search tree as an active node:
            TREE(q):=TREE(p), PARENT(q):=p, A:=A∪{q};
        if TREE(q) ≠∅ and TREE(q)≠TREE(p) then
            return P = PATH(s→t)
    end for
    remove p from A
end while
return P = ∅
```

Augmentation stage: The input for this stage is a path P from s to t. Note that the orphan set is empty in the beginning of the stage, but there might be some orphans in the end since at least one edge in P becomes saturated.

```
find the bottleneck capacity Δ on P
update the residual graph by pushing flow Δ through P
for each edge (p,q) in P that becomes saturated
    if TREE(p) = TREE(q) = S then
        set PARENT(q) := ∅, O := O ∪ {q};
    if TREE(p) = TREE(q) = T then
        set PARENT(p) := ∅, O := O ∪ {q};
end for
```

Adoption stage: During this stage all orphan nodes in O are processed until O becomes empty. Each node p being processed tries to find a new valid parent within the same search tree. In case of success p remains in the tree but with a new parent, otherwise it becomes a free node and all its children are added to O.

```
while O ≠∅ do
    pick an orphan node p∈O and remove it from O
    process p
end while
```

The operation "process p" includes the following steps. Recall that it is trying to find a new valid parent for p among its neighbors. A valid parent q should satisfy TREE(q)=TREE(p), tree_cap(q→p)>0, and the "origin" of q should be either the source or sink. Note that the last condition is necessary because during adoption stage some of the nodes in the search trees S or T may originate from orphans.

If node p finds a new valid parent q then set PARENT(p)=q. In this case p remains in its search tree and the active (or passive) status of p remains unchanged. If p does not find a valid parent then p becomes a free node and the following operations are performed:

```
scan all neighbors q of p such that TREE(q) = TREE(p):
    if tree_cap(q→p)>0 add q to the active set A
    if PARENT(q)=p add q to the set of orphans O and set PARENT(q):=∅;
TREE(p) := ∅, A := A - {p}
```

Note that as p becomes free all its neighbors connected through non-saturated edges should became active. It may happen that some neighbor q did not qualify as a valid parent during adoption stage because it did not originate from the source or the sink. However, this node could be a valid parent after adoption stage is finished. At this point q must have active status as it is located next to a free node p.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 24:
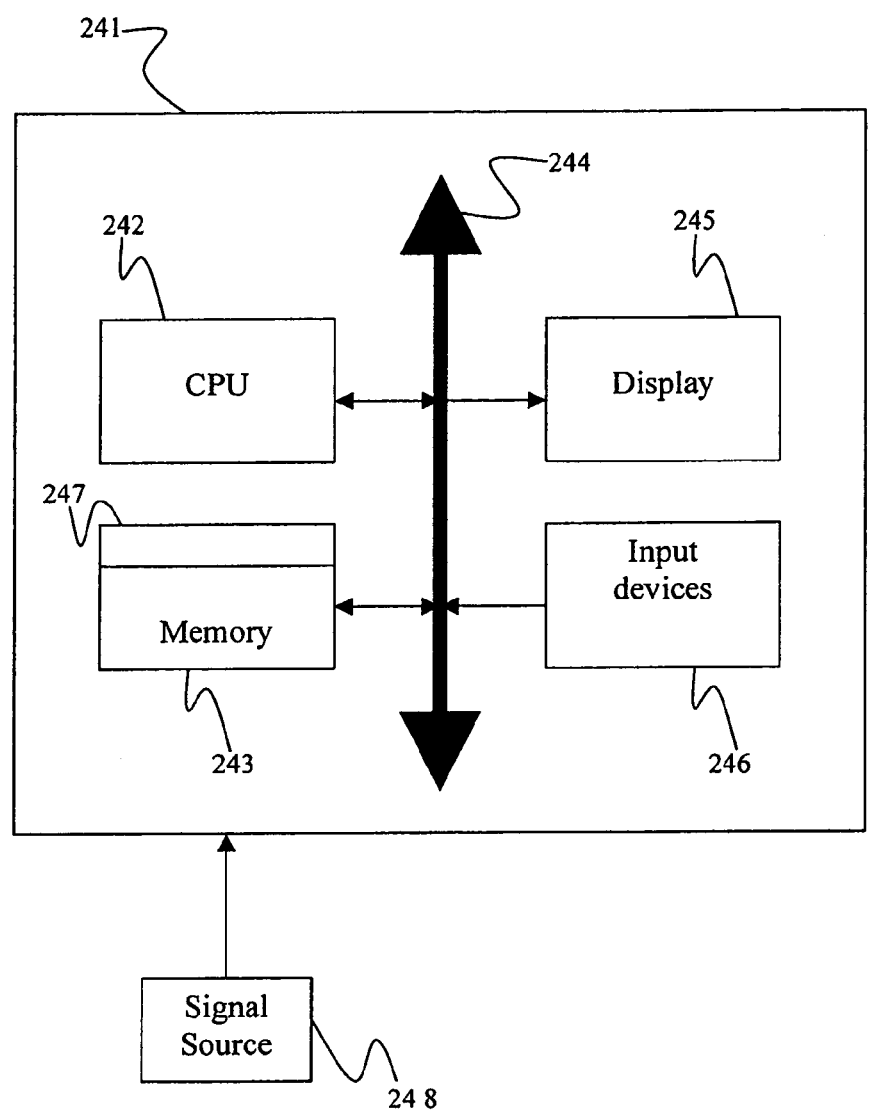
FIG. 24 is a block diagram of an exemplary computer system for implementing a method for minimizing static and dynamic MRFs, according to an embodiment of the invention.

FIG. 24 is a block diagram of an exemplary computer system for implementing a method for minimizing static and dynamic MRFs, according to an embodiment of the invention. Referring now to FIG. 24, a computer system 241 for implementing the present invention can comprise, inter alia, a central processing unit (CPU) 242, a memory 243 and an input/output (I/O) interface 234. The computer system 241 is generally coupled through the I/O interface 244 to a display 245 and various input devices 246 such as a mouse and a keyboard. The support circuits can include circuits such as cache, power supplies, clock circuits, and a communication bus. The memory 243 can include random access memory (RAM), read only memory (ROM), disk drive, tape drive, etc., or a combinations thereof. The present invention can be implemented as a routine 247 that is stored in memory 243 and executed by the CPU 242 to process the signal from the signal source 248. As such, the computer system 241 is a general purpose computer system that becomes a specific purpose computer system when executing the routine 247 of the present invention.

The computer system 241 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for determining an optimal labeling of pixels in computer vision, comprising the steps of:
   providing a digitized image comprising a plurality of intensities associated with an N-dimensional grid of points;
   modeling said image by a graph comprising a set of interior nodes N and a set of edges E wherein each image point p is associated with a graph node and each pair of nearest neighbor points p, q is connected by a graph edge, wherein each graph node p is associated with a singleton potential c(p), and each graph edge is associated with a pairwise potential function d(p, q);
   randomly assign a label from a set of labels L to each point p to initialize a set of unary variables x, said unary variables including an indicator function $x_p(\ )$ that indicate which label is assigned to which point p, and initialize a set of dual variables y to zero, wherein said dual variables include a height variable $h_p(a)$ associated with each node p and label a, and balance variables $y_{pq}(a)$, $y_{qp}(a)$ associated with each edge (p, q) and label a, wherein $$h_p(a) \equiv c_p(a) + \sum_{q:\, qp \in E} y_{pq}(a);$$

and
   for each label in L, selecting a new label c from said set L, constructing a capacitated graph G and solving a max-flow in said capacitated graph G to calculate an updated pair x', y',
   wherein said updated unary and dual variables satisfy the conditions $$h_p(x_p) = \min_{a \in L} h_p(a),\ \forall p \in V,$$

$$y_{pq}(x_p) + y_{qp}(x_p) = w_{pq}d(x_p, x_q),\ \forall pq \in E,$$

$$y_{pq}(a) + y_{qp}(b) \leq 2w_{pq}d_{max},\ \forall pq \in E, a \in L, b \in L,$$

wherein $w_{pq}$ is a weighting associated with each edge p,q, and wherein said label selection divides said image into disjoint regions.

2. The method of claim 1, wherein solving said max-flow in said graph comprises providing a copy of all labels in 1 for each node p, wherein said height variables $h_p(a)$ specify a height of label a of node p relative to a reference plane, and updating balance variables of said c label to move said labels up or down until said conditions are satisfied, wherein a value of balance variable $y_{pq}(a)$ represents a partial raise of label a at p due to edge pq, while a total raise of a at p equals a sum of partial raises from all edges of G incident to p.

3. The method of claim 1, further comprising initializing said balance variables $y_{pq}(x_p)$, $y_{qp}(x_q)$ for all edges pq wherein $y_{pq}(x_p) + y_{qp}(x_q) = w_{pq}d(x_p, x_q)$.

4. The method of claim 1, further comprising, before selecting a new label c from said set L, for all edges pq, adjusting said balance variables $y_{pq}(c), y_{qp}(c)$ for said label c if $y_{pq}(c) + y_{qp}(x_q) > w_{pq}d(c, x_q)$ or $y_{pq}(x_p) + y_{qp}(c) > w_{pq}d(x_p, c)$.

5. The method of claim 1, further comprising, after selecting a new label c from said set L, for all edges pq, if $y'_{pq}(x'_p) + y'_{qp}(x'_q) > w_{pq}d(x'_p, x'_q)$, adjusting said balance variables $y'_{pq}(x'_p), y'_{qp}(x'_q)$ for said label $x'_p = c$ or $x'_q = c$ wherein $y'_{pq}(x'_p) + y'_{qp}(x'_q) = w_{pq}d(x'_p, x'_q)$.

6. The method of claim 1, wherein constructing said capacitated graph G comprises:
   adding an external source node s and an external sink node t to said graph;
   for all internal nodes,
      connecting a node p to sink node t through an external directed edge pt if $h_p(c) \geq h_p(x_p)$ and defining a capacity of said edge as $cap_{pt} = h_p(c) - h_p(x_p)$, or
      connecting a node p to source node s through an external directed edge ps if $h_p(c) < h_p(x_p)$ and defining a capacity of said edge as $cap_{sp} = h_p(x_p) - h_p c$; and
   for all internal edges pq connecting internal nodes p, q,
      defining a capacity $cap_{pq} = cap_{qp} = 0$ if $x_p = c$ or $x_q = c$; or
      defining a capacity $cap_{pq} = \max[w_{pq}d(c, x_q) - \text{load}_{pq}(c, x_q), 0]$ and a capacity $cap_{qp} = \max[w_{pq}d(x_p, c) - \text{load}_{pq}(x_p, c), 0]$ if $x_p \neq c$ and $x_q \neq c$.

7. The method of claim 6, wherein calculating an updated pair x', y' comprises calculating all flows $f_{sp}, f_{pt}$, for all external edges sp, pt, and flows $f_{pq}$, for all internal edges pq, calculating $y'_{pq}(c) \leftarrow y_{pq}(c) + f_{pq} - f_{qp}$ for all internal edges pq, and, for all internal nodes, setting $x'_p \leftarrow c$ if an unsaturated path from s to p exists.

8. The method of claim 6, further comprising initializing a source tree and a sink tree for finding new augmenting paths, adding new augmenting paths to the source tree during max-flow, and keeping track of all source-linked nodes wherein source-linked nodes need not be recomputed at each iteration of said max-flow.

9. The method of claim 6, further comprising incrementally setting capacities, wherein if during an interval from a previous to a current iteration, no change of label took place for p and q, then capacities of interior edges pq, qp and of exterior edges sp, pt, sq, qt are set equal to residual capacities of corresponding edges in a graph of the previous iteration.

10. The method of claim 1, further comprising updating said singleton potential function c(p) and said pairwise potential function d(p,q), reinitializing said unary variables x and dual variables y from said updated pair x', y', incrementing said balance variables $y_{pq}(x_p)$ for each edge (pq) by a difference $w_{pq}d(x_p, x_q) - \overline{w}_{pq}\overline{d}(x_p, x_q)$ wherein $\overline{w}^{pq}$ is an updated weight and $\overline{d}(x_p, x_q)$ is the updated pairwise potential function, and incrementing said height variables $h_p(x_p)$ for each node p by a difference $c_p(x_p) - \overline{c}_p(x_p)$, wherein $\overline{c}_p(x_p)$ is the updated singleton potential.

11. A method for determining an optimal labeling of pixels in computer vision, comprising the steps of:
   providing a digitized image comprising a plurality of intensities associated with an N-dimensional grid of points;
   modeling said image by a graph comprising a set of interior nodes N and a set of edges E wherein each image point p is associated with a graph node and each pair of nearest neighbor points p, q is connected by a graph edge, wherein each graph node p is associated with a singleton potential c(p), and each graph edge is associated with a pairwise potential function d(p, q);
   randomly assign a label from a set of labels L to each point p to initialize a set of unary variables x, said unary variables including an indicator function $x_p(\ )$ that indicate which label is assigned to which point p, and initialize a set of dual variables y to zero, wherein said dual variables include a height variable $h_p(a)$ associated with each node p and label a, and balance variables $y_{pq}(a)$, $y_{qp}(a)$ associated with each edge (p, q) and label a, wherein $$h_p(a) \equiv c_p(a) + \sum_{q:\, qp \in E} y_{pq}(a);$$

and providing a copy of all labels in l for each node p, wherein said height variables $h_p(a)$ specify a height of label a of node p relative to a reference plane, and updating balance variables of said c label to move said labels up or down until conditions are satisfied, wherein a value of balance variable $y_{pq}(a)$ represents a partial raise of label a at p due to edge pq, while a total raise of a at p equals a sum of partial raises from all edges of said graph incident to p, wherein said label assignment divides said image into disjoint regions.

12. The method of claim 11, further comprising, for each label in L, selecting a new label c from said set L, constructing a capacitated graph G and calculating an updated pair x', y' in said capacitated graph, wherein said updated unary and dual variables satisfy the conditions $$h_p(x_p) = \min_{a \in L} h_p(a), \forall p \in V,$$

$$y_{pq}(x_p) + y_{qp}(x_p) = w_{pq} d(x_p, x_q), \forall pq \in E,$$

$$y_{pq}(a) + y_{qp}(b) \leq 2 w_{pq} d_{max}, \forall pq \in E, a \in L, b \in L,$$

wherein $w_{pq}$ is a weighting associated with each edge p,q.

13. A non-transitory program storage device readable by a computer, tangibly embodying a program of instructions executable by the computer to perform the method steps for determining an optimal labeling of pixels in computer vision, said method comprising the steps of:

providing a digitized image comprising a plurality of intensities associated with an N-dimensional grid of points;

modeling said image by a graph comprising a set of interior nodes N and a set of edges E wherein each image point p is associated with a graph node and each pair of nearest neighbor points p, q is connected by a graph edge, wherein each graph node p is associated with a singleton potential c(p), and each graph edge is associated with a pairwise potential function d(p,q);

randomly assign a label from a set of labels L to each point p to initialize a set of unary variables x, said unary variables including an indicator function $x_p(\ )$ that indicate which label is assigned to which point p, and initialize a set of dual variables y to zero, wherein said dual variables include a height variable $h_p(a)$ associated with each node p and label a, and balance variables $y_{pq}(a)$, $y_{qp}(a)$ associated with each edge (p, q) and label a, wherein $$h_p(a) \equiv c_p(a) + \sum_{q:\, qp \in E} y_{pq}(a);$$

and for each label in L, selecting a new label c from said set L, constructing a capacitated graph G and solving a max-flow in said capacitated graph G to calculate an updated pair x', y', wherein said updated unary and dual variables satisfy the conditions $$h_p(x_p) = \min_{a \in L} h_p(a), \forall p \in V,$$

$$y_{pq}(x_p) + y_{qp}(x_p) = w_{pq} d(x_p, x_q), \forall pq \in E,$$

$$y_{pq}(a) + y_{qp}(b) \leq 2 w_{pq} d_{max}, \forall pq \in E, a \in L, b \in L,$$

wherein $w_{pq}$ is a weighting associated with each edge p,q, and wherein said label selection divides said image into disjoint regions.

14. The computer readable program storage device of claim 13, wherein solving said max-flow in said graph comprises providing a copy of all labels in l for each node p, wherein said height variables $h_p(a)$ specify a height of label a of node p relative to a reference plane, and updating balance variables of said c label to move said labels up or down until said conditions are satisfied, wherein a value of balance variable $y_{pq}(a)$ represents a partial raise of label a at p due to edge pq, while a total raise of a at p equals a sum of partial raises from all edges of G incident to p.

15. The computer readable program storage device of claim 13, the method further comprising initializing said balance variables $y_{pq}(x_p)$, $y_{qp}(x_q)$ for all edges pq wherein $y_{pq}(x_p) + y_{qp}(x_q) = w_{pq} d(x_p, x_q)$.

16. The computer readable program storage device of claim 13, the method further comprising, before selecting a new label c from said set L, for all edges pq, adjusting said balance variables $y_{pq}(c)$, $y_{qp}(c)$ for said label c if $y_{pq}(c) + y_{qp}(x_q) > w_{pq} d(c, x_q)$ or $y_{pq}(x_p) + y_{qp}(c) > w_{pq} d(x_p, c)$.

17. The computer readable program storage device of claim 13, the method further comprising, after selecting a new label c from said set L, for all edges pq, if $y'_{pq}(x'_p) + y'_{qp}(x'_q) > w_{pq} d(x'_p, x'_q)$, adjusting said balance variables $y'_{pq}(x'_p), y'_{qp}(x'_q)$ for said label $x'_p = c$ or $x'_q = c$ wherein $y'_{pq}(x'_p) = w_{pq} d(x'_p, x'_q)$.

18. The computer readable program storage device of claim 13, wherein constructing said capacitated graph G comprises:

adding an external source node s and an external sink node t to said graph;

for all internal nodes, connecting a node p to sink node t through an external directed edge pt if $h_p(c) \geq h_p(x_p)$ and defining a capacity of said edge as $cap_{pt} = h_p(c) - h_p(x_p)$, or connecting a node p to source node s through an external directed edge ps if $h_p(c) < h_p(x_p)$ and defining a capacity of said edge as $cap_{sp} = h_{p(x_p)} - h_p(c)$; and for all internal edges pq connecting internal nodes p, q, defining a capacity $cap_{pq} = cap_{qp} = 0$ if $x_p = c$ or $x_q = c$; or defining a capacity $cap_{pq} = \max[w_{pq} d(c, x_q) - load_{pq}(c, x_q), 0]$ and a capacity $cap_{qp} = \max[w_{pq} d(x_p, c) - load_{pq}(x_p, c), 0]$ if $x_p \neq c$ and $x_q \neq c$.

19. The computer readable program storage device of claim 18, wherein calculating an updated pair x', y' comprises calculating all flows $f_{sp}$, $f_{pt}$ for all external edges sp,pt, and flows $f_{pq}$ for all internal edges pq, calculating $y'_{pq}(c) \leftarrow y_{pq}(c) + f_{pq} - f_{qp}$ for all internal edges pq, and, for all internal nodes, setting $x'_p \leftarrow c$ if an unsaturated path from s to p exists.

20. The computer readable program storage device of claim 18, the method further comprising initializing a source tree and a sink tree for finding new augmenting paths, adding new augmenting paths to the source tree during max-flow, and keeping track of all source-linked nodes wherein source-linked nodes need not be recomputed at each iteration of said max-flow.

21. The computer readable program storage device of claim 18, the method further comprising incrementally setting capacities, wherein if during an interval from a previous to a current iteration, no change of label took place for p and q, then capacities of interior edges pq, qp and of exterior edges sp, pt, sq, qt are set equal to residual capacities of corresponding edges in a graph of the previous iteration.

22. The computer readable program storage device of claim 13, the method further comprising updating said singleton potential function c(p) and said pairwise potential function d(p,q), reinitializing said unary variables x and dual variables y from said updated pair x', y', incrementing said balance variables $y_{pq}(x_p)$ for each edge (pq) by a difference $w_{pq}d(x_p, x_q) - \overline{w}_{pq}\overline{d}(x_p, x_q)$ wherein $\overline{w}^{pq}$ is an updated weight and $\overline{d}(x_p, x_q)$ is the updated pairwise potential function, and incrementing said height variables $h_p(x_p)$ for each node p by a difference $c_p(x_p) - \overline{c}_{p(xp)}$, wherein $\overline{c}_p(x_p)$ is the updated singleton potential.

* * * * *